US012265925B2

(12) United States Patent
Segner et al.

(10) Patent No.: US 12,265,925 B2
(45) Date of Patent: Apr. 1, 2025

(54) CLOUD WORKLOAD MANAGEMENT USING WORKLOAD PROFILES

(71) Applicant: VERIZON PATENT AND LICENSING INC., Basking Ridge, NJ (US)

(72) Inventors: Brent D. Segner, Marysville, MD (US); Ryan M. O'Donnell, Phoenix, MD (US); Myron Eugene Bagwell, Southlake, TX (US); Christopher A. Rollins, Averill Park, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 999 days.

(21) Appl. No.: 17/232,690

(22) Filed: Apr. 16, 2021

(65) Prior Publication Data
US 2022/0335317 A1    Oct. 20, 2022

(51) Int. Cl.
*G06N 7/01* (2023.01)
*G06N 20/00* (2019.01)

(52) U.S. Cl.
CPC .............. *G06N 7/01* (2023.01); *G06N 20/00* (2019.01)

(58) Field of Classification Search
CPC .................................. G06N 7/01; G06N 20/00
See application file for complete search history.

(56) References Cited

U.S. PATENT DOCUMENTS

| 2018/0205666 A1* | 7/2018 | Nash | .................. H04L 67/10 |
| 2021/0109796 A1* | 4/2021 | Fozard | .................. G06F 9/48 |

FOREIGN PATENT DOCUMENTS

WO    WO-2022095302 A1 *    5/2022    ........... G06K 9/6219

OTHER PUBLICATIONS

Prats et al. "Automatic Generation of Workload Profiles Using Unsupervised Learning Pipelines", IEEE TNSM, 2018, pp. 142-155.*
Neagoe et al. ("Improved Gaussian Mixture Model With Expectation-Maximization for Clustering of Remote Sensing Imagery", IGARSS 2016, pp. 3063-3065.*
Chen et al. ("Energy Efficiency for Large-Scale MapReduce Workloads with Significant Interactive Analysis", EuroSys, 2012, pp. 43-56.*

* cited by examiner

*Primary Examiner* — Li Wu Chang

(57) ABSTRACT

Disclosed are embodiments for profiling active workloads in a cloud platform and downstream applications for improving cloud infrastructure based on the profiling. In one embodiment, a method comprises receiving telemetry vectors from a computing device in a cloud platform, each of the telemetry vectors including a plurality of measured values associated with a workload executing on the computing device; clustering the telemetry vectors using an unsupervised learning algorithm, the unsupervised learning algorithm outputting parameters associated with a plurality of clusters; and generating a workload profile from the plurality of clusters by selecting at least one cluster from the plurality of clusters and storing corresponding parameters of the at least one cluster as the workload profile.

19 Claims, 11 Drawing Sheets

CLOUD WORKLOAD MANAGEMENT USING WORKLOAD PROFILES

BACKGROUND INFORMATION

The rise of cloud computing has allowed for the virtualization of a large variety of workloads. The breadth of workloads brings a tremendous amount of complexity around managing the different workloads within the same environment. A principal unmet challenge is to ensure that the base cloud infrastructure supports all the applications' performance needs across such a diverse base.

DETAILED DESCRIPTION OF EXAMPLE EMBODIMENTS

Figure 1:
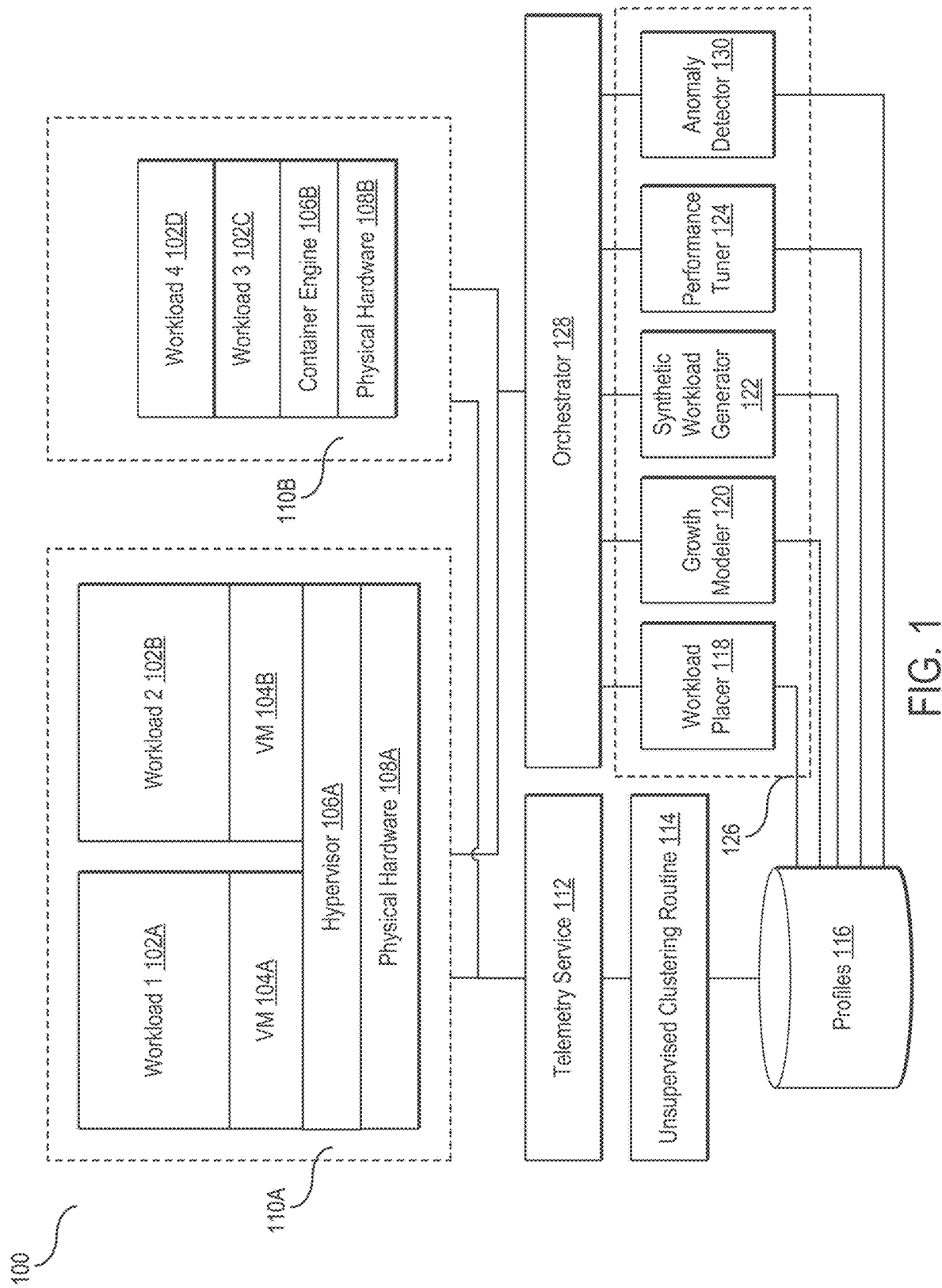
FIG. 1 is a block diagram of a cloud platform according to some embodiments.

Currently, cloud providers overprovision computing hardware (e.g., servers) to ensure maximum availability for workloads on a distributed platform. Specifically, cloud providers overprovision resources in terms of both quantity and performance to ensure there is no adverse impact on service. Overprovisioning resources may be sustainable on a small scale, but as the number of network services supported expands, many negative implications emerge. These implications include stranded resources, increased cost per component, and unnecessary allocation of power and space to underutilized infrastructure.

The example embodiments discussed herein describe the generation and use of workload profiles which represent probabilistic models of the operation of actual workloads in a cloud platform. The workload profiles allow cloud providers to effectively anticipate the needs for shared resources (e.g., network bandwidth, storage, etc.). Without this level of consideration, one or more services might experience performance degradation as the applications run into contention while competing for shared resources. In addition to evaluating the potential burden on shared resources, workload profiles identify the quantity and performance requirements of resources to meet the need for the workload (i.e., CPU, GPU, memory, local disk, network performance, etc.). Further, workload profiles can be used for creating models that can predict the type and quantity of resources required. Such models improve forecasting capabilities and provide more accurate data for infrastructure builds.

The example embodiments collect telemetry data produced by the cloud platform associated with the operation of workloads. The example embodiments then utilize an unsupervised learning algorithm to cluster the telemetry data associated with a workload (or set of related workloads) to generate the workload profile. The workload profile may then be used to predict or simulate the needs of a future deployment of a similar workload. This allows an operator of a cloud platform to tune the infrastructure and distribution of workloads accordingly, e.g., either in terms of existing infrastructure or when selecting groupings of hardware to which to deploy new instances of a workload for execution.

In the example embodiments, devices, methods, and computer-readable media are disclosed. The example embodiments receive telemetry vectors from a computing device in a cloud platform where each of the telemetry vectors includes measured values associated with a workload (e.g., a container or a virtual machine) executing on the computing device. An unsupervised learning algorithm clusters the data represented by the telemetry vectors and outputs parameters associated with the clustering. A workload profile may be generated by storing the parameters associated with the clustering and an identifier that associates the parameters with a workload.

In some embodiments, the plurality of measured values comprises one or more of the number of packets transmitted; the number of bytes transmitted; the number of packets received; the number of bytes received; the number of disk read requests; the number of disk write requests; the number of bytes read from disk; the number of bytes written to disk; processor instructions executed per second; memory utilization; resource quantity; resource performance settings; resource locations; the number of resource instances; and external influences.

In some embodiments, receiving telemetry vectors from a computing device in a cloud platform comprises receiving the telemetry vectors over a pre-configured time span and wherein the clustering is performed upon expiration of the pre-configured time span. In some embodiments, clustering the telemetry vectors comprises constructing a Gaussian Mixture Model (GMM) based on the telemetry vectors. In some embodiments, the GMM comprises a sum of k mixture components trained using the telemetry vectors, where k is a positive integer. In some embodiments, after receiving the telemetry vectors, the method comprises applying an expectation-maximization algorithm to the telemetry vectors to estimate parameters of the GMM. In some embodiments, the workload profile includes a plurality of distribution sets, each distribution set associated with a type of the measured values.

The example embodiments further provide downstream applications that use the workload profiles. In a first embodiment, an application receives a second workload and a candidate workload profile associated with the second workload and retrieves active workload profiles that are associated with workloads executing in the cloud platform. Next, the application generates node configurations, each node configuration including the candidate workload profile and a combination of the active workload profiles. Based on these configurations, the application reallocates workloads based on an optimal node configuration.

In another embodiment, an application generates an infrastructure model of the cloud platform and simulates workloads using the infrastructure model and a plurality of workload profiles generated using the unsupervised learning algorithm.

In another embodiment, an application generates a test script using at least one metric stored in the workload profile. The application then executes the test script in a test environment corresponding to the cloud platform, executing the test script generating an alternative workload profile for the workload. After executing the test script, the application computes a comparison between the workload profile and the alternative workload profile.

In another embodiment, an application assigns a c-state setting and p-state setting to the workload based on the workload profile and tunes a physical processing element executing the workload based on the c-state setting and p-state setting.

FIG. 1 is a block diagram of an example cloud platform 100 that may be useful to illustrate some of the example embodiments described herein.

In the illustrated embodiment, a cloud platform 100 can operate a plurality of hardware devices such as device 110A and device 110B. In one embodiment, the hardware devices comprise computing devices such as servers (an example of which is described below and in FIG. 11). In general, any commercially available server may be used, although in some implementations the computing devices may be special-purpose devices for specific uses such as graphics processing, network control, and transport, machine learning and data analytics, and the like. Although only two devices are illustrated, the cloud platform 100 may include many such devices. In some embodiments, the devices are homogenous devices; that is, the devices are computing devices having similar or identical specifications (e.g., number of processors, memory size, etc.). In other embodiments, the devices may comprise heterogenous devices; that is, the devices are computing devices having different specifications. In the illustrated embodiment, the devices may be networked to form a "cloud" of computing devices. In some implementations, cloud platform 100 may be a "multi-tenant" cloud, allowing multiple entities to deploy applications across the platform 100.

In some implementations, all or a portion of the cloud platform 100 may be implemented using a cloud platform such as the OpenStack cloud computing platform managed by the OpenStack Foundation. OpenStack provides various components that may be deployed to implement services useful in managing the operation of a cloud platform. In the illustrated embodiment, the cloud platform 100 may provide various services such as compute, networking, block storage, identity management, image processing, object storage, orchestration, telemetry, databases, messaging, message queues, container orchestration, elastic search, etc.

In the illustrated embodiment, each device 110 includes infrastructure to support the execution of various workloads. For example, the device 110A includes physical hardware 108A. As used herein, the physical hardware 108A refers to the underlying physical hardware implementing the device 110A. Examples of physical hardware 108A include the number of central processing units (CPUs), the amount of memory, the number of network interface cards (NIC), etc. A given device 110A may further include a hypervisor 106A. In one embodiment, a hypervisor 106A can comprise a software device configured to emulate physical hardware, thereby allowing workloads to execute using "virtual" resources. For example, the hypervisor 106A can establish a number of virtual CPUs (vCPUs), virtual memory, virtual NICs, etc. The hypervisor 106A may comprise a native or hosted hypervisor. The device 110A may further include any number of virtual machine (VM) 104A, 104B layers. A virtual machine layer comprises a guest operating system (OS) that uses the virtual resources provided by the hypervisor 106A. As illustrated, a given hypervisor 106A may support multiple VMs 104A, 104B. In the illustrated embodiment, each VM 104A, 104B can support workloads 102A, 102B, respectively.

In the illustrated embodiment, in addition to VM-based systems, the cloud platform 100 may support container-based systems. For example, device 110B may include physical hardware 108B (similar to physical hardware 108A) as well as a container infrastructure 106B (for example, an operating system executing a container engine such as Docker®, rkt, etc.). In general, containers may represent a package of software that includes certain of its dependencies, which allows it to be deployed on any system that has a compatible container engine 106B. In some embodiments, a container-based system may also include virtual machine infrastructure such as described with respect to device 100A (for example, container infrastructure 106B may execute within a VM deployed on a hypervisor). Although only virtual machines and containers are illustrated in FIG. 1, other deployment technologies may be used alone or in combination with those illustrated. For example, the cloud platform 100 may deploy virtual network function (VNF) and container network function (CNF) instances as well as generalized virtual machine and container instances.

As used herein, a "workload" comprises a process running (either actively or idly) on a device 110. In one embodiment, the workload may comprise any application software executing in a VM or container. The combination of a container/VM and a workload can be referred to as an image. Each deployment of a workload/image to a device 110 can be referred to as an instance. In some embodiments, one or more workloads can be considered an application. That is, an application may comprise a number of different workloads that may be interconnected through interfaces or other mechanisms. For example, in a cellular network, a network function (such as packet gateway (PGW) application) may comprise a plurality of different workloads to perform its different capabilities (e.g., user plane functions, control plane functions, administrative functions). In the illustrated embodiment, a first workload 102A is deployed in VM 104A, and a second workload 102B is deployed in VM 104B, both of which are executing on device 110A. A third workload 102C and a fourth workload 102D are each deployed as containers to the container engine 106B executing on device 110B.

In the illustrated embodiment, the devices 110A, 110B can be communicatively coupled to a telemetry service 112. In one embodiment, the telemetry service 112 can comprise software and/or a hardware device configured to aggregate telemetry data from devices 110A, 110B. In one embodiment, telemetry data can comprise any measurable performance attribute of a device 110A, 110B. For example, telemetry data may comprise CPU utilization, memory allocation, vCPU utilization, virtual memory allocation, NIC or virtual NIC traffic, etc. In one embodiment, telemetry service 112 is configured to periodically poll the devices 110A, 110B and retrieve telemetry data. In another embodiment, each device 110A, 110B, periodically transmits telemetry data to the telemetry service 112.

In one embodiment, the telemetry service 112 receives telemetry data from all devices in the cloud platform 100. In another embodiment, the telemetry service 112 may only receive telemetry data from a subset of the devices in the cloud platform 100. In another embodiment, the cloud platform 100 may deploy multiple instances of the telemetry service 112. In this embodiment, each telemetry service 112 may receive telemetry data from a subset of the devices in the cloud platform 100.

In the illustrated embodiment, an unsupervised clustering routine 114 is configured to receive telemetry data from the telemetry service 112. As used herein, a payload of telemetry data transmitted between the telemetry service 112 and unsupervised clustering routine 114 is referred to as a telemetry vector. In some embodiments, the telemetry service 112 transmits telemetry vectors at regular intervals. In some embodiments, the telemetry service 112 streams telemetry vectors to the unsupervised clustering routine 114. Alternatively, or in conjunction with the foregoing, the telemetry service 112 may transmit telemetry vectors to the unsupervised clustering routine 114 in batches.

In the illustrated embodiment, the unsupervised clustering routine 114 processes the telemetry vectors and generates workload profiles for each workload (102A-102D) in the cloud platform 100. In one embodiment, the workload profiles comprise density distributions of the various metrics reported via telemetry service 112. Details of the operation of unsupervised clustering routine 114 are provided in FIGS. 2 through 4 and the discussion below. In some embodiments, the unsupervised clustering routine 114 continuously updates the workload profiles. In the illustrated embodiment, the unsupervised clustering routine 114 writes the workload profiles to a storage device such as profiles storage 116. In the illustrated embodiment, profiles storage 116 may comprise relational or other databases for storing workload profiles. In one embodiment, the workload profiles may be indexed by a workload (or instance) identifier to enable quick retrieval.

In the illustrated embodiment, an application pool 126 includes a plurality of applications (e.g., workload placer 118, growth modeler 120, synthetic workload generator 122, and performance tuner 124) that retrieve and utilize workload profiles stored in profiles storage 116. Applications in the application pool 126 are referred to as downstream applications. Although only four applications are illustrated, any number of applications can be included in the application pool 126. As illustrated, the applications in the application pool 126 communicate with an orchestrator 128. In the illustrated embodiment, the orchestrator 128 may comprise any software or hardware capable of adjusting the operation of the cloud platform 100. That is, orchestrator 128 may comprise any software or hardware system or tool, either automated or manual, used to adjust the operations of cloud infrastructure. As a non-limiting example, in a core cellular network, orchestrator 128 may comprise a Management and Orchestration (MANO) device comprising a network functions virtualization (NFV) orchestrator, virtual network function (VNF) manager, and virtualized infrastructure manager (VIM). Additionally, while downstream applications in the application pool 126 are illustrated as communicating with the orchestrator 128, in some embodiments, the downstream applications are not required to do so. That is, the downstream applications may receive workload profiles and operate on the workload profiles without communicating with the orchestrator 128.

In general, the applications in the application pool 126 transmit instructions to the orchestrator 128. In one embodiment, the orchestrator 128 receives the commands and adjusts the devices 110A/110B in response. For example, orchestrator 128 may reallocate workloads from one device to another in response to instructions from the workload placer 118. As another example, the orchestrator 128 may adjust a processor setting or a memory setting based on instructions from the performance tuner 124. Alternatively, or in conjunction with the foregoing, the applications in the application pool may not modify the devices 110A, 110B or may perform other operations prior to providing instructions to modify the devices 110A, 110B. For example, growth modeler 120 may use the profiles to predict a future workload demand. As another example, synthetic workload generator 122 may use the profiles to simulate a hypothetical change in the cloud platform 100 infrastructure. In some embodiments, the synthetic workload generator 122 may then adjust the actual infrastructure after performing the synthetic workload analysis. Details of each of the applications 118, 120, 122, and 124 are discussed further herein.

Figure 2:
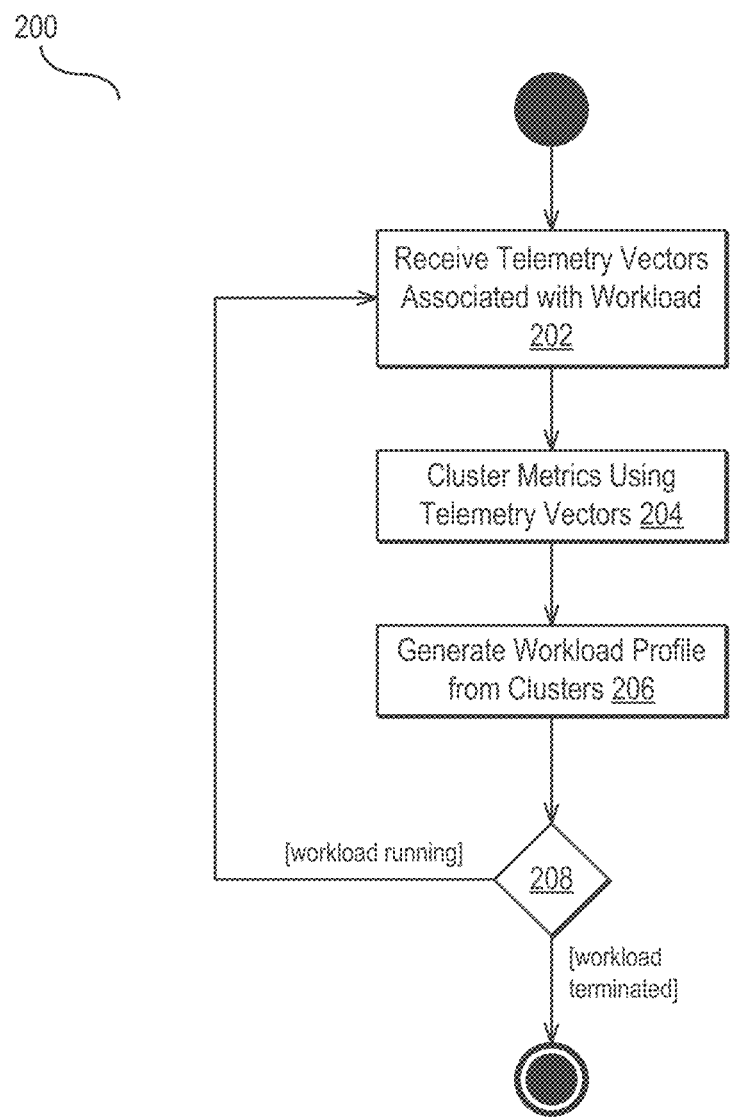
FIG. 2 is a flow diagram illustrating a method for building a workload profile according to some embodiments.

FIG. 2 is a flow diagram illustrating a method 200 for building a workload profile according to some embodiments.

In step 202, the method 200 can comprise receiving telemetry vectors associated with a workload. Although the following description primarily emphasizes the profiling of a single workload (including multiple instances of the same workload image), the method 200 can be extended to model an arbitrary number of workloads.

In one embodiment, the method 200 can receive a telemetry vector from a monitoring or telemetry service of a cloud platform. In one embodiment, the method 200 can receive a telemetry vector at a regular interval (e.g., every five minutes or once per day). In one embodiment, the method 200 can receive telemetry vectors from multiple sources. In this embodiment, the method 200 can receive telemetry vectors at different frequencies based on the source. For example, the method 200 can receive streaming telemetry vectors at five-minute intervals and may receive reference information at daily intervals. In the illustrated embodiment, reference information may comprise diagnostic data describing the resource usage for hosts and instances executing in a cloud environment (e.g., resource usages of server hardware, deployed hypervisors, etc.). For example, the reference information may include a sum of the virtual CPUs for instances running on any given host, the amount of RAM installed in any given server, host and instance metadata (e.g., identifiers, names, etc.), In general, reference information may comprise any data regarding the cloud infrastructure that does not change in real-time (as compared to streaming telemetry vectors).

In the illustrated embodiment, the method 200 can accumulate telemetry vectors over a preconfigured time span. In one embodiment, this time span can comprise a time period greater than the largest frequency in which the method 200 receives telemetry vectors. For example, if the method 200 receives telemetry vectors from a first source at five-minute increments and from a second source at daily increments, the method 200 may use a time span of greater than one day.

In some embodiments, the time span is significantly longer than the largest frequency in which the method 200 receives telemetry vectors. For example, workloads in a telecommunications environment (e.g., cellular network) can typically be cyclical. That is, the cycles of workload activity can mirror user behavior patterns and can vary on both an hourly and daily basis. Thus, in such an example, the method 200 may accumulate telemetry vectors over a period of a week. In other scenarios, the method 200 may accumulate telemetry data over a longer period, such as month or quarter, to account for season data usage changes. As another example, some telecommunications workloads may experience higher utilization during weekdays and business hours and lower utilization during nights and weekends. Similarly, voice traffic in a cellular network may be heaviest during weekday rush hours. Thus, in these examples, the method 200 may use a minimum of a one-week time span in which to accumulate telemetry vectors.

In one embodiment, the method 200 may monitor identical workloads executing concurrently. For example, in a cellular network, a workload implementing a network function may be replicated in many locations across the network. In some embodiments, the workloads may be physically dispersed among multiple devices and geographic locations. In such an environment, method 200 may accumulate data to ensure an even, or mostly even, distribution of telemetry vectors based on geographic location. By sampling across the entire set of workloads, the method 200 can account for variations in users, sessions, or transactions that may have geographic dependencies. For example, a workload physically situated in a major metropolitan area may likely experience higher utilization than an identical workload physically situated in a more rural setting.

In some embodiments, the telemetry vector can comprise a series of measured values associated with the workload.

As a first example, the measured values can include a packets transmitted ("Packet Tx") value and packets received value ("Packets Rx") which may comprise two values representing the number of packets sent and received through a networking interface associated with the workload (e.g., a virtual network interface card (NIC) associated with the workload), respectively. In some embodiments, the Packets Tx and Packets Rx values may each comprise a cumulative value representing the number of packets transmitted and received, respectively, since the workload was activated or other time period. Alternatively, or in conjunction with the foregoing, the Packets Tx and Packets Rx values may each comprise an instantaneous transmission and reception rate (e.g., in packets per second), respectively.

As a second example, the measured values can include a bytes transmitted value ("Bytes Tx") and bytes received value ("Bytes Rx") which may comprise two values representing the number of bytes sent and received through a networking interface associated with the workload, respectively. In some embodiments, the Bytes Tx and Bytes Rx values may each comprise a cumulative value representing the number of bytes transmitted and received, respectively, since the workload was activated or other time period. Alternatively, or in conjunction with the foregoing, the Bytes Tx and Bytes Rx values may each comprise an instantaneous transmission and reception rate (e.g., in bytes per second), respectively.

As a third example, the measured values can include an instructions per second value ("Instructions") which may comprise data representing the number of instructions executed associated with the execution of the workload. In some embodiments, the Instructions value may comprise a cumulative value representing the total number of CPU instructions executed since the workload was activated or other time period. Alternatively, or in conjunction with the foregoing, the Instructions value may comprise an instantaneous rate of instructions executed by the CPU (e.g., in instructions per second).

As a fourth example, the measured values can include a disk read requests ("Disk Read Requests") and disk write requests value ("Disk Write Requests") which may comprise two values representing the number of read and write requests, respectively, sent to the disk associated with the workload. In some embodiments, the Disk Read Request and Disk Write Requests values may each comprise a cumulative value representing the number of disk read and write requests, respectively since the workload was activated or other time period. Alternatively, or in conjunction with the foregoing, the Disk Read Request and Disk Write Request values may each comprise an instantaneous rate of requests to write to and read from a disk (e.g., in requests per second), respectively.

As a fifth example, the measured values can include a number of bytes read from ("Disk Read Bytes") or a number of bytes written to disk ("Disk Write Bytes") which may comprise two values representing a number of bytes read from or written to disk, respectively, associated with the workload. In some embodiments, the Disk Read Bytes and Disk Write Bytes values may each comprise a cumulative value representing the number of bytes read and written to disk, respectively, since the workload was activated or another time period. Alternatively, or in conjunction with the foregoing, the Disk Read Bytes and Disk Write Bytes values may each comprise an instantaneous rate of bytes read from and written to a disk (e.g., in bytes per second), respectively.

As a sixth example, the measured values can include a memory utilization value ("Mem") which may comprise the amount of capacity used by a memory device associated with the workload. In one embodiment, the Mem value comprises a volume of real or virtual random-access memory (RAM) used by the instance from the amount of its allocated memory.

As a seventh example, the measured values can include a resource quantity value ("Resource Q") which includes one or more the number of CPUs or vCPUs allocated to the workload, the number of virtual NICs associated with the workload, and the total memory (real or virtual) allocated to the workload.

As an eighth example, the measured values can include a resource performance settings value ("Resource Perf. Settings") which stores the settings for various resources (e.g., vCPU, memory, NIC, etc.). For example, the Resource Perf. Settings value may store a vCPU state (e.g., pinned to thread, pinned to core, oversubscribed, etc.) or vNIC settings (e.g., Virtio, DPDK, SR-IOV, etc.).

As a ninth example, the measured values can include a location value ("Location") which may comprise data representing the physical location of a workload (e.g., data center location). As a tenth example, the measured values can include an instance value ("Instances") which may comprise the number of instances of workloads being executed that are based on the same workload image.

As an eleventh example, the measured values can include an external influence value ("Ext. Influence") which may comprise data reflective of external forces influencing the behavior of the workload. Examples of such forces include, but are not limited to, the number of users accessing the workload, the number of network transactions touching the workload, etc. In some embodiments, the Ext. Influence value may comprise any measurable data that is measurable above the hardware level of the workload.

The foregoing eleven non-limiting examples may be received individually or combined as a single telemetry vector. In some embodiments, the eleven examples may all be transmitted, while in some embodiments, a subset of the eleven examples may be transmitted. Certainly, other measurable workload-related data may be transmitted in other implementations, and the examples described herein are illustrative. For example, a number of cache hits and misses, the number of CPU cycles per instruction, cache capacity and usage, etc., may all be useful measures depending on the workload type. In general, the telemetry vector may include any data that is reflective of the impact a workload has on the underlying physical infrastructure. Finally, the telemetry vector may also include metadata (e.g., instance identifiers, type identifiers, Internet Protocol addresses, etc.) used to identify the source of the telemetry vector.

In step 204, the method 200 clusters the telemetry vectors. In one embodiment, the method 200 can use a soft-boundary unsupervised clustering algorithm to cluster the telemetry vectors. In this embodiment, each telemetry vector is assigned a probability of being included in a given cluster. Further, the algorithm clusters the telemetry vectors without pre-labeling. In some embodiments, the method 200 may normalize the telemetry vectors prior to analysis. For example, the method 200 may convert each metric into a z-score. Alternatively, or in conjunction with the foregoing, a sigmoid function may be used to ensure a bounded range of metric values.

In one embodiment, the method 200 can utilize a Gaussian Mixture Model (GMM) to probabilistically cluster the telemetry vectors. In the illustrated embodiment, a GMM comprises a probabilistic model that assumes all the data points are generated from a mixture of a finite number of Gaussian distributions with unknown parameters. In one embodiment, the GMM comprises a sum of k mixture components trained using the telemetry vectors, where k is a positive integer. In some embodiments, to identify these unknown parameters, the method 200 may use an Expectation-Maximization (EM) algorithm. Generally, an EM algorithm is an iterative method to find (local) maximum likelihood or maximum a posteriori (MAP) estimates of parameters in the GMM. In some embodiments, the modeled environment represented by the telemetry vectors can include unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found on the E step.

Figure 3:
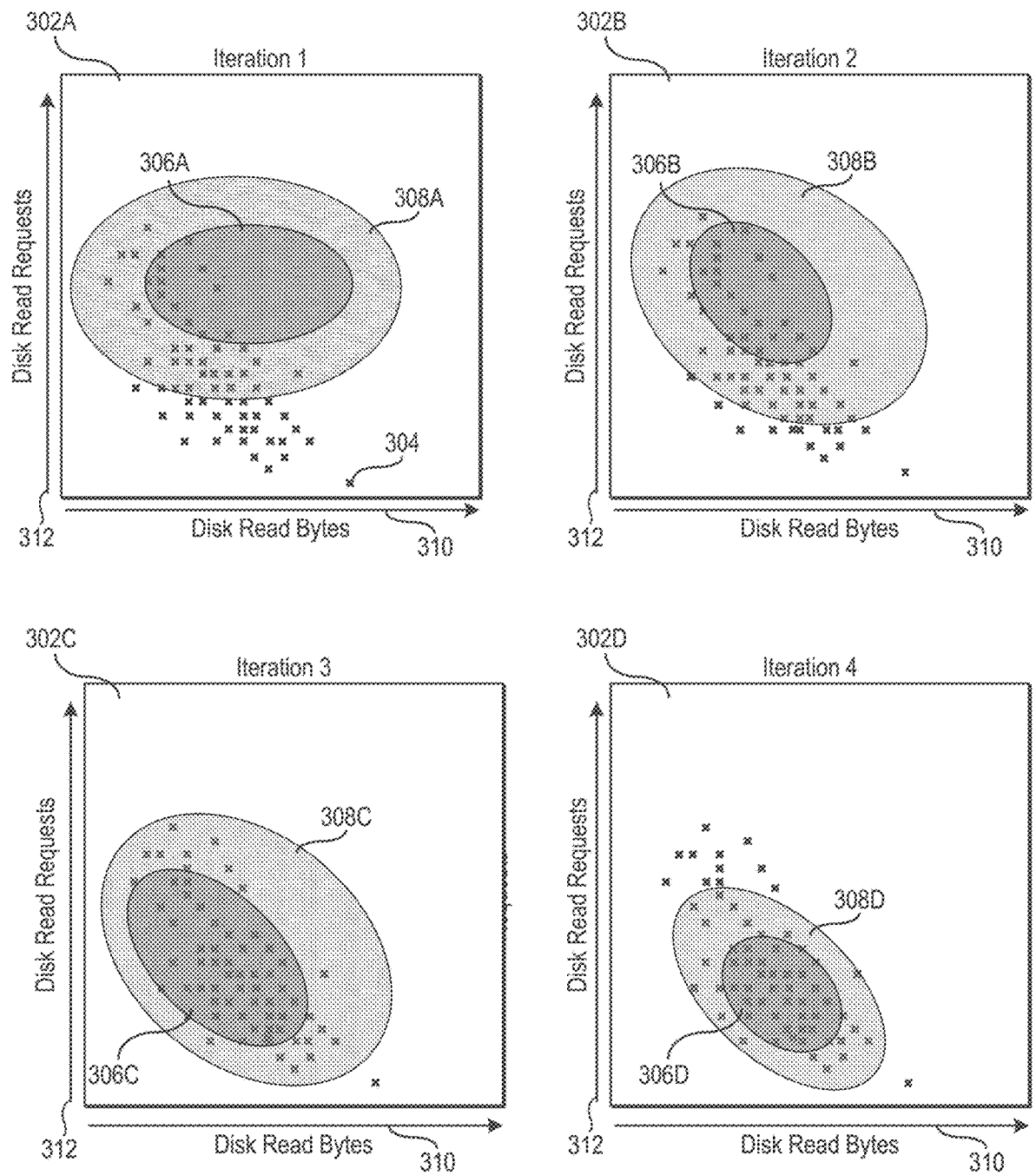
FIG. 3 is a graphical depiction of an Expectation-Maximization (EM) algorithm as applied to two metrics of a telemetry vector according to some embodiments.

FIG. 3 is a graphical depiction of an example EM algorithm as applied to two metrics of a telemetry vector according to some embodiments.

In the illustrated embodiment, a plurality of iterations of an EM algorithm is graphically plotted, including a first iteration (302A), second iteration (302B), third iteration (302C), and fourth iteration (302D). Each iteration plots the average number of bytes read ("Disk Read Bytes") on the horizontal axis (310) and the number of disk read operations ("Disk Read Requests") on the vertical axis (312). Each of the iterations (302A-302D) includes a plurality of measured points including exemplary point 304 represented via markers. In each instance, a Gaussian distribution is depicted in a contour plot representation having two distributions (e.g., 306A-306D and 308A-308D) defined by contour lines. In general, the distributions 306A-306D and 308A-308D represent the likelihood of the values measured (in this case, for read requests and read bytes). Thus, for example, the distributions indicate in first iteration 302A that a measured point is more likely to fall within distribution 306A versus distribution 308A. Certainly, more than two distributions may be used.

As illustrated, in each iteration (302A-302D), the method 200 can perform an EM algorithm iteration. Thus, in first iteration 302A, the method 200 can generate a first estimate of the values for the latent variables, optimize the model, then repeating these steps in second iteration 302B, third iteration 302C, and fourth iteration 302D until convergence. As illustrated, after convergence (e.g., fourth iteration 302D), the method 200 can estimate the density of the measured data, accounting for missing data, used in a soft-labeling clustering algorithm like a GMM. In the example above, the method 200 can continually iterate over the set of disk read observations for a particular workload. In some embodiments, this iterative process will continue until the algorithm can identify specific performance parameters and ranges that have the maximum likelihood of representing the behavior being evaluated.

Although illustrated as a two-dimensional distribution, the example embodiments are not limited as such. Indeed, univariate Gaussian distributions may be used, or n-dimensional Gaussian distributions may be used. Further, while a GMM/EM approach has been discussed, other suitable clustering algorithms may be used. For example, a density-based spatial clustering of applications with noise (DBSCAN) methodology may be used to cluster the telemetry vectors.

In step 206, the method 200 generates a workload profile from the clusters.

In some embodiments, the aforementioned EM process performed in step 204 is repeated for each workload instance across each metric in the telemetry vectors that would either be reflective of performance or potentially impact performance. The composite of each of these performance clusters for each workload instance would form the basis of the workload profile described more fully in FIG. 4. In some embodiments, the GMM generates multiple clusters per-metric. In some embodiments, the method 200 may select the highest weighted cluster as the primary cluster. In some embodiments, the method 200 may use all clusters when building the workload profile. In some embodiments, the number of clusters may be controlled via an associated hyperparameter.

In one embodiment, the workload profile comprises an aggregation of the density distributions calculated in step 204. In some embodiments, the workload profile stores the parameters defining the Gaussian distributions for each metric or set of metrics. Thus, each metric may be associated with, for example, a weight ($\pi$), mean ($\mu$), and variance ($\sigma$) or corresponding vectors or matrices, depending on the dimensionality of the vectors.

Figure 4:
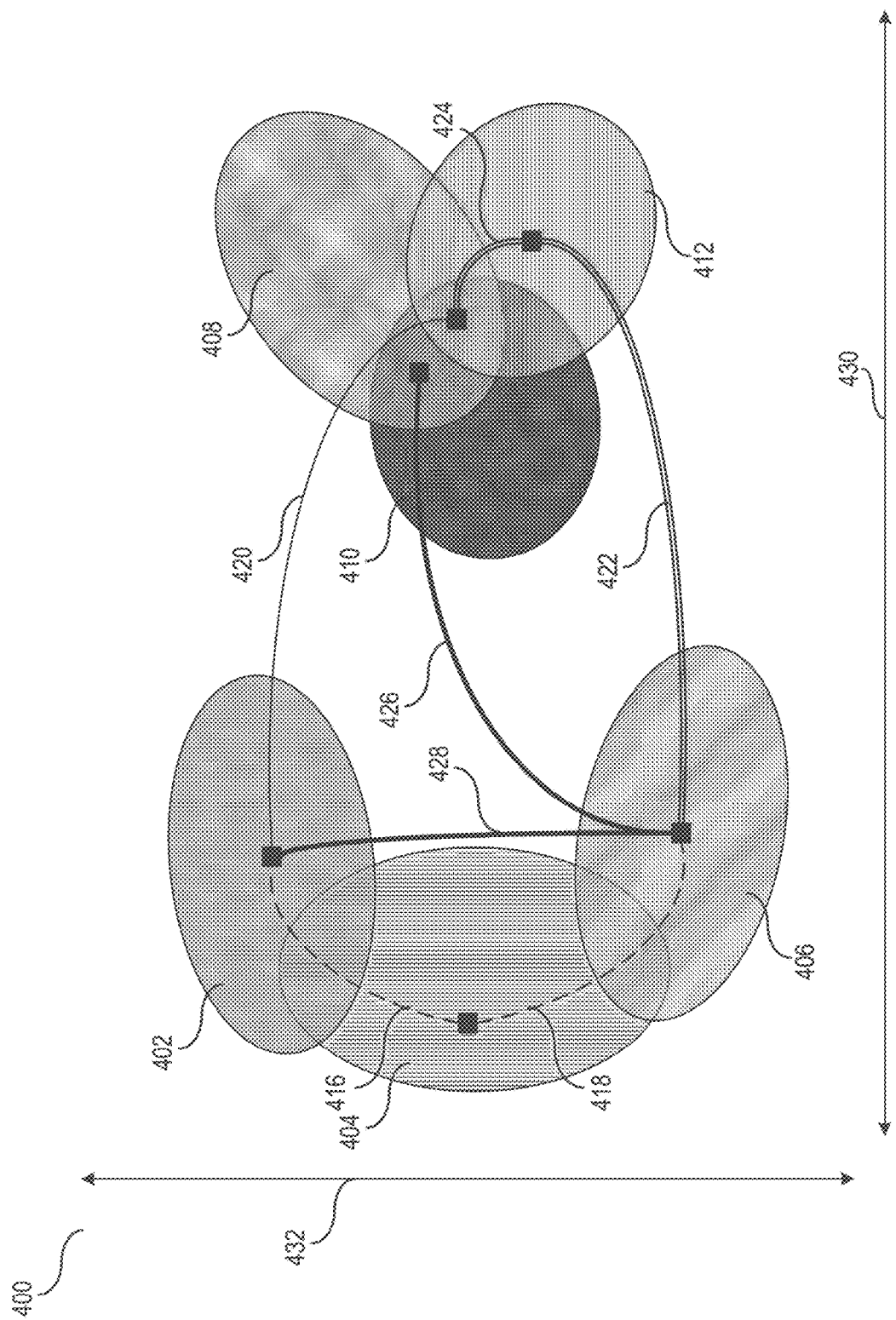
FIG. 4 is a graphical depiction of a workload profile according to some embodiments.

FIG. 4 is a graphical depiction of an example of a workload profile according to some embodiments.

In the illustrated embodiment, a graph 400 plots a plurality of distributions 402, 404, 406, 408, 410, and 412. In the illustrated embodiment, each of the distributions 402, 404, 406, 408, 410, and 412 may correspond to a result from a clustering operation, such as the GMM applied to one or more measured metrics, as described previously. In the illustrated embodiment, although only two axes (432, 430) are illustrated, each distribution 402, 404, 406, 408, 410, and 412 may be plotted according to the underlying data type and data values. The specific values and types are not limiting and thus are omitted from the illustrated graph 400 to improve clarity. In some embodiments, the data in the distributions 402, 404, 406, 408, 410, and 412 are normalized to enable visualization on a single plot. However, the visualization of distributions 402, 404, 406, 408, 410, and 412 is generally not required for downstream applications and is only presented for exemplary purposes.

As discussed, each of the distributions may be associated with a weight ($\pi$), mean ($\mu$) and variance ($\sigma$) or corresponding vectors or matrices. In the illustrated embodiment, contour lines of the distributions 402, 404, 406, 408, 410, and 412 are omitted for the sake of clarity. Based on the parameters defining distributions 402, 404, 406, 408, 410, and 412, the method 200 can calculate correlations between metrics. Specifically, the method 200 can calculate strong positive correlations (426, 428), weak positive correlations (416, 418), weak negative correlations (420), and strong negative correlations (422, 424). In one embodiment, correlations represent the relatedness of the distributions 402, 404, 406, 408, 410, and 412. In one embodiment, the correlations (416, 418, 420, 422, 424, 426, and 428) can be computed based on the parameters of the GMM. For example, the correlations (416, 418, 420, 422, 424, 426, and 428) can be computed as correlation coefficients (e.g., a value between 1 and −1, wherein 1 represents a strong positive correlation and −1 represents a strong negative correlation). In one embodiment, the correlation coefficient comprises Pearson's correlation coefficient. Alternatively, sample or population coefficients may be generated.

In some embodiments, the workload profile for a workload can be represented in a structured form such as a JavaScript Object Notation (JSON) format, a Yet Another Markup Language (YAML) format, or an eXtensible Markup Language (XML) format. In this embodiment, the method 200 can generate a key for each metric or metric set and set the value equal to the Gaussian distribution parameters and a mapping of correlations with other metrics or metric sets.

In step 208, the method 200 determines if a workload is still instantiated. In one embodiment, the workload comprises a single workload instance (e.g., a single VM or container). In this scenario, the method 200 continuously executes steps 202 through 206 during the lifetime of the workload. Once the workload terminates, the method 200 ceases receiving telemetry vectors and thus ends.

As discussed above, the method 200 may be executed for each type of workload in a cloud platform. For example, a network function (NF) in a 5G cellular network may be provided using multiple workload instances of the same type (e.g., based on a single workload image). In a scenario where multiple instances of the same type of workload are running concurrently, the method 200 may continue to execute steps 202 through 206 until all of the multiple instances are terminated. In some implementations, the method 200 may attempt to balance the receipt of vectors in step 202 to ensure that data from one workload instance does not overwhelm the model. For example, if one workload is instantiated to serve a high traffic zone and another workload is instantiated to server a low traffic zone, the method 200 may attempt to evenly add vectors from each zone to the training data set. Thus, in some embodiments, the method 200 may end or pause executing step 202 if it cannot equally distribute vectors among replicated workloads.

Since the workload profile includes a plurality of distributions for various metrics, the workload profile can then be used to generate arbitrary or random data for the underlying metric(s) (sometimes referred to as synthetic data). One result is a profile that can be used to simulate the operational impact of an individual workload. As will be discussed, this feature of the workload profiles can be used in various scenarios to improve the operation of, for example, a cloud platform implementing a cellular network.

In some embodiments, after a number of workload profiles have been created based on performance modeling of existing production workloads, the method 200 may group them into larger ranges that are applicable for other functions ranging from forecasting to infrastructure selection and performance tuning, as discussed below in connection with FIGS. 5 through 8. For example, the method 200 may set three target performance tiers. The various workload profiles can then be grouped into each of the respective tiers based on their identified performance requirements. Such grouping may be useful for orchestration purposes so that services can be deployed that match user requirements for the service.

Figure 5:
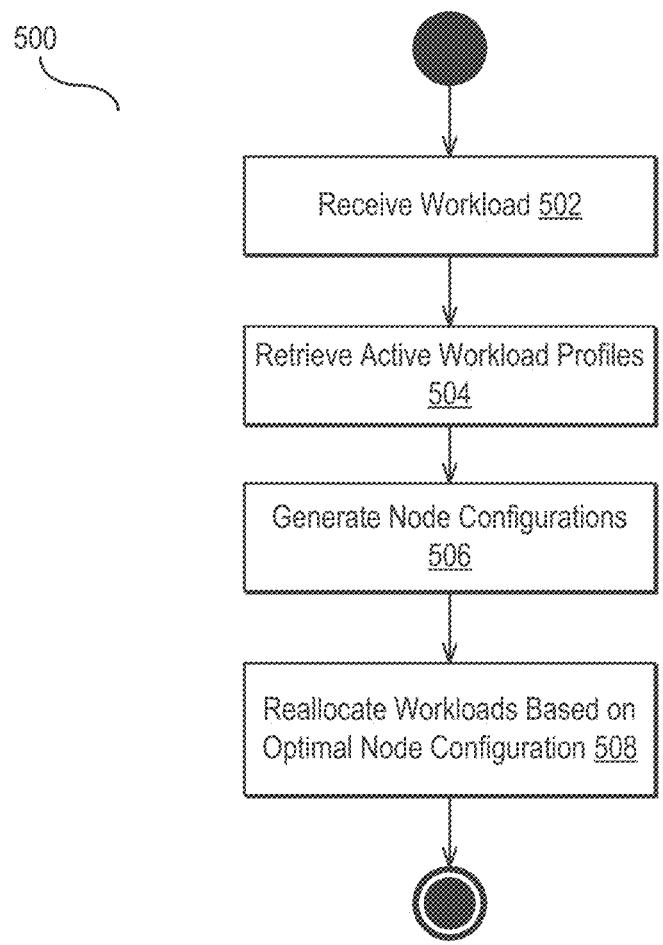
FIG. 5 is a flow diagram illustrating a method for placing a workload in a cloud platform according to some embodiments.

FIG. 5 is a flow diagram illustrating an example method for placing a workload in a cloud platform according to some embodiments. All or portions of method 500 may be performed by workload placer 118.

In step 502, the method 500 may comprise receiving a request to instantiate a new workload instance and a candidate workload profile associated with the new workload.

In the illustrated embodiment, a new workload instance refers to a software application to execute on a cloud platform's infrastructure. In some embodiments, the new workload instance is associated with an identifier. In some embodiments, the new workload instance comprises a new instance of a workload image known to the platform. In such an embodiment, the request to instantiate a new workload instance may just comprise an identifier of the workload image and, if necessary, any configuring parameters. For example, a cloud platform may manage a repository of workload images defining resources, application code, etc. In such a scenario, the request to instantiate a new workload would reference that image and include any required or optional parameters to further configure the image.

In the illustrated embodiment, each new workload instance is associated with a candidate workload profile. In the illustrated embodiment, the candidate workload profile may be generated as discussed above and in FIGS. 2 through 4. In one embodiment, the candidate workload profile may be generated based on the operations of previous workload instances based on the same workload image. For example, if the new workload instance is to be an instance of a known workload image, the method 500 can retrieve a previously generated workload profile associated with that image. As an example, a cellular network operator may wish to allocate an additional packet gateway (P-GW) instance in a 4G network to handle increased user plane traffic. In this scenario, the operator may request a new instance of a packet gateway (P-GW) image. Additionally, existing workload instances of the P-GW image may have been previously deployed, and the cloud platform may have already created a workload profile for workloads based on the P-GW image based on these previous deployments. In this manner, since the new workload is derived from the image, the existing workload profile can be used as the candidate workload profile.

In step 504, the method 500 may comprise retrieving active workload profiles.

In one embodiment, the cloud platform may manage a plurality of other workloads. For example, in a cellular core network, the cloud platform may manage a plurality of concurrently instantiated mobility manager workloads, session gateways, packet gateways, subscriber databases, etc. In one embodiment, the cloud platform manages these workloads and thus can identify the workload profiles associated with all actively running workloads (i.e., the active workload profiles). Since the active workload profiles have already been generated continuously during their lifetimes, retrieval of the active workload profiles placed minimal or no load on the cloud infrastructure. In some embodiments, the method 500 may further include grouping the active workload profiles based on physical deployment. That is, each active workload profile corresponding to workloads instantiated on a single physical computing device may be grouped, and so forth.

In step 506, the method 500 may comprise generating node configurations, each of the node configurations including the candidate workload profile and a combination of the active workload profiles.

In the illustrated embodiment, a node configuration may describe the workloads present on a given computing device. In a first embodiment, the method 500 groups the active workload profiles based on their current allocation to physical devices. Next, the method 500 may iterate through each group and predict the load on the device if the new workload is allocated to the device. In another embodiment, the method 500 may not group the active workload profiles and may instead "rebuild" all node configurations to include the new workload. The latter approach may result in movement of more workloads because the method is starting without any existing constraints, but may achieve a more efficient and/or balanced distribution of workloads.

In either scenario, the method 500 determines a node configuration by forecasting the resource utilization of a node upon the addition of the new workload. Specifically, each node configuration includes a plurality of workloads and thus active workload profiles. The method 500 adds the candidate workload profile to this configuration and then simulates the expected load on the device. In the illustrated embodiment, simulating a load may comprise generating random performance data for each of the workload profiles in the node configuration. Since a workload profile comprises a GMM, the GMM can be used to generate arbitrary amounts of random data related to the telemetry metrics (e.g., CPUs used, memory allocated, bytes written to disk, etc.). Since the GMMs are Gaussian distributions, the time to synthesize the data is minimal. Thus, in some embodiments, the method 500 may, for each candidate node configuration, execute hundreds or thousands of random samplings to determine whether the node configuration falls within the available resources of a device. In some embodiments, the method 500 may additionally simulate a time period (e.g., one week). For example, if the telemetry vectors used to generate the workload profiles are received every five minutes and the workload profiles are updated weekly, the method 500 may execute 2,016 simulations.

In one embodiment, the method 500 executes these simulations and computes the total expected resource utilization load that may be placed on a given device for a given node configuration. A total expected resource utilization may comprise the average or maximum values for metrics as predicted by the workload profiles. For example, the method 500 may compute the maximum CPU utilization, the total number of bytes written, etc.

In some embodiments, the method 500 may forgo simulations and use the statistical telemetry metrics as the corresponding metrics of each workload in a node configuration. In this embodiment, the method 500 may aggregate, for example, the averages across workloads in the node configuration to arrive at a result vector. For example, if three workloads (two active and one new workload) each are expected to utilize 25% of CPU time and 15% of memory on average and each is expected to write 100 MB to disk on average during a sampling period, the method 500 can compute the aggregate node configuration metrics as 75% CPU time, 45% memory usage, and 300 MB of free disk space. Maximum values (or values within one or more standard deviations from average) across workloads may also be used, which may be useful to avoid overload conditions for those unlikely but statistically possible situations.

Some measurement aggregations are actionable without reference to the underlying device hardware. For example, the above example of a predicted 75% aggregate CPU utilization means that the hardware can support the three workloads. However, some metrics require knowledge of the underlying hardware. For example, an expected disk write total of 300 MB requires knowledge of the total disk size. In some implementations, method 500 may expect a minimum resource configuration is available at each device, or may have information on actual device configurations that can be used as part of the method 500.

In step 508, the method 500 may comprise reallocating workloads based on an optimal node configuration.

In one embodiment, after generating the node configurations, the method 500 can provide instructions to allocate the new workload to the cloud infrastructure accordingly. In one embodiment, the method 500 selects an optimal node configuration from the collection of node configurations. In one embodiment, the method 500 can immediately exclude from selection any node configurations that cannot be handled by the underlying physical hardware of the device associated with the node configuration (e.g., require more CPU resources than supported by the underlying device). In some embodiments, the method 500 may then select a node configuration that is expected to use the physical hardware resources as close to completely as possible. That is, the method 500 may favor (for example) a node configuration that uses eight of eight CPUs versus one that uses two of eight CPUs. In another embodiment, the method 500 may attempt to avoid orphaned resources. For example, the method 500 may deprioritize configurations that only leave small amounts of resources after deployment. For example, if a device supports 16 GB of random-access memory (RAM) and three workloads, in aggregate, require 15.9 GB of RAM, the method 500 may de-prioritize that configuration. Conversely, if the underlying hardware supports 64 GB of memory, the method 500 may not deprioritize such a configuration given the available memory after deployment. In some embodiments, method 500 may attempt to balance the resource usage among available devices. For example, method 500 may select a node configuration that places a new workload with devices having minimum expected resource utilization. Such an allocation scheme may be useful to ensure performance.

In one embodiment, the method 500 may instantiate the new workload by deploying the workload to a selected existing physical device. For example, orchestrator 128 may receive the instruction described above to instantiate the new workload to the device associated with the selected node configuration. Alternatively, or in conjunction with the foregoing, the method 500 may reallocate existing workload instances by moving these workloads among different physical devices. For example, orchestrator 128 may receive the instruction described above to move certain existing workloads according to the node configuration(s).

The aforementioned embodiments illustrate how a probabilistic workload profile can be used to synthesize workload performance and infrastructure impact prior to deployment. As described, the workload profile is not theoretical but instead based on the actual past performance of other instances of the workload. Further, it can be used to generate random performance data that closely mirrors real-world observed conditions. These features enable a more confident deployment of workloads to cloud infrastructure.

In a related embodiment, in some instances, the workload profiles can be used for anomaly detection. Given that a deployed instance is associated with an existing workload profile, in some embodiments, the method 500 can monitor all workload instances to determine if they are executing within the probability distribution of the corresponding workload profiles. If not, the method 500 can trigger an alarm indicating as such. Specifically, the application pool 126 may include an anomaly detector 130. The anomaly detector 130 can periodically retrieve current telemetry data from workload instances executing on devices (e.g., 110A, 110B) (via, for example, orchestrator 128). In one embodiment, the current telemetry data may comprise current measured data of a workload instance. The anomaly detector 130 can then compare the current telemetry data to an expected probability distribution stored in a workload profile associated with the workload instance. Specifically, the anomaly detector 130 can use the workload profile to calculate the probability that a current telemetry data point appears in one or more probability distributions in the workload profile. In one embodiment, the anomaly detector 130 may utilize a preset distance threshold to classify the determined probability as an anomaly. Thus, if the calculated probability of the current telemetry data being in one or more of the probability distributions is below this preset threshold, the anomaly detector 130 may classify the workload instance as containing an anomaly. In some embodiments, the anomaly detector 130 may accumulate such detections over a time period before classifying the workload instance as operating anomalously. For example, the anomaly detector 130 may require that a fixed number of anomalies be detected in a given time period (e.g., one hour) before trigging the alarm indicating as such.

Another capability provided by the example embodiments is a way to more accurately perform infrastructure planning for cloud computing deployments. Existing solutions for infrastructure growth planning (e.g., resource capacity and slicing, data center supportability) in cloud environments typically rely on theoretical application/workload resource forecasts as the mechanism by which to derive long-term infrastructure capacity and performance requirements. However, current modeling struggles when modeling down to the application level due to lack of information about the way a workload will behave when instantiated (e.g., how much high-performance compute is needed versus general compute, what tiers of storage are the usage driving, etc.). Additionally, application/workload requirements tend to be volatile and often change based on updates to application design, testing benchmarking, and/or perceived performance needs. This deficiency in current solutions makes forecasting the need for more resources such as compute, storage, and networking inaccurate, which is suboptimal for longer-term infrastructure growth planning (cloud and building) that can take months to years to complete.

In contrast, the processes described herein can use workload profiles in the modeling of infrastructure growth based on actual resource consumption/behavior data and not theoretical values. Incorporating the workload profiles into the modeled environment enables the more accurate prediction of the expected impact of those workloads on the infrastructure. Furthermore, the increased granularity of the modeling enabled by the workload profiles allows for more targeted infrastructure deployments that can match the workload profiles running within a particular cloud. The capability thus results in significant improvements across a host of cloud planning functions, such as efficiently utilizing existing infrastructure (e.g., power efficiency, time efficiency), creating a more stable supply chain for infrastructure acquisition and deployment, and increasing the return on investment made in the infrastructure.

Figure 6:
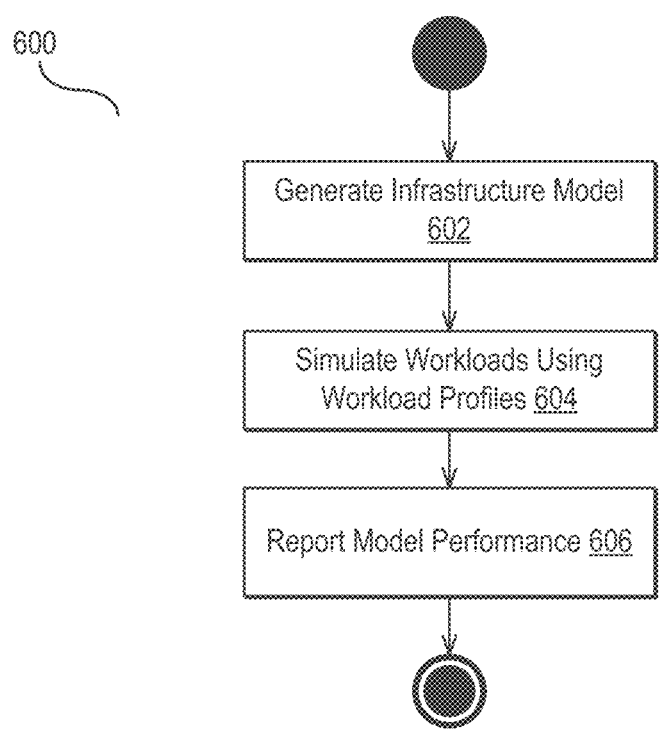
FIG. 6 is a flow diagram illustrating a method for modeling a cloud platform according to some embodiments.

FIG. 6 is a flow diagram illustrating a method for modeling a cloud platform according to some embodiments. All or portions of method 600 may be performed by growth modeler 120.

In step 602, the method 600 may comprise generating an infrastructure model of a cloud platform.

In one embodiment, the infrastructure model comprises a representation of the hardware comprising the cloud platform (e.g., servers, network fabric, routers, switches, etc.). In one embodiment, the various hardware of the cloud platform is represented as a data structure or similar model. Further, the connections and monitored performance of the hardware are modeled along with the attributes of the hardware. In one embodiment, a commercial off-the-shelf modeling system may be used to generate the infrastructure model, although other modeling systems may be used.

In step 604, the method 600 simulates workloads on the model of the cloud platform using workload profiles.

In the illustrated embodiment, the method 600 uses the workload profiles to simulate the operation of workloads on the infrastructure model. As discussed above, a workload profile for a given workload comprises a GMM. This GMM can be used to generate arbitrary output representative of the workload during actual operation. In some embodiments, the method 600 may retrieve workload profiles corresponding to all active workloads. The method 600 may then simulate all of the telemetry metrics of the workloads and apply these simulated outputs to the infrastructure model.

In some embodiments, the method 600 may adjust one or more of the workloads and the infrastructure model to predict future needs. For example, the method 600 may increase the number of instances of a given workload and synthesize metrics for these new instances on the infrastructure.

As an example, a cellular network operator can simulate its existing cloud infrastructure and current required workloads. As discussed previously, these workloads may correspond to network functions (NFs) implementing the cellular network. As one example, the operator may desire to increase the number of NF instances by replicating instances of certain NFs. Since the workload to be replicated has already been modeled, its corresponding workload profile(s) can be used to generate random, consistent performance data. This generated performance data can then be input into the infrastructure model (e.g., via packet insertion, etc.) to analyze the response of the infrastructure. In some scenarios, the operator may determine that the current configuration of hardware cannot support the new instance and can thus adjust the model accordingly until tuned to meet the new workloads.

In some embodiments, step 604 may be executed iteratively and/or repeatedly until the desired amount and type of workloads is met and when the required changes to the infrastructure model are finalized.

In step 606, the method 600 reports the performance of the infrastructure model of the cloud platform in response to the simulation.

In one embodiment, the method 600 may continuously re-execute a given simulation. In this embodiment, the method 600 may continuously generate random data based on the workload profiles. The method 600 can thus continuously simulate an infrastructure based on actual measured data of workloads.

In some embodiments, the method 600 may output the results of these simulations. In one embodiment, the output may identify failed nodes, links, etc., as well as the number and frequency of failures. In some embodiments, the method 600 may output other parameters of the infrastructure such as energy consumption, cooling requirements, etc. necessary to support the infrastructure.

Figure 7:
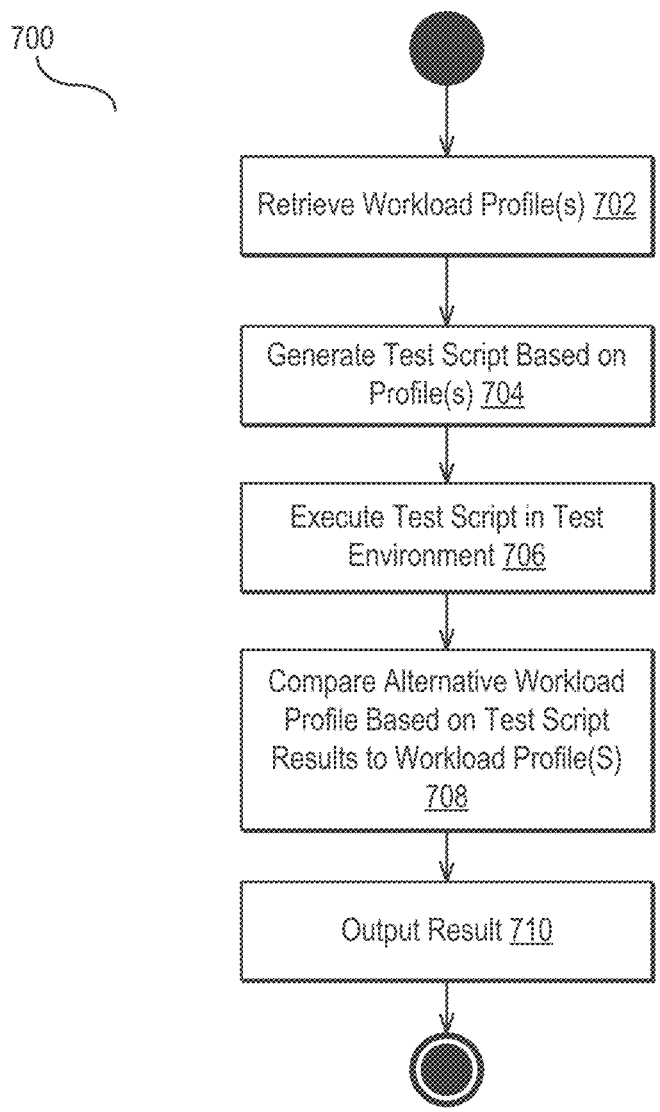
FIG. 7 is a flow diagram illustrating a method for performing synthetic workload generation using workload profiles according to some embodiments.

FIG. 7 is a flow diagram illustrating a method for performing synthetic workload profile generation according to some embodiments. All or portions of method 700 may be performed by synthetic workload generator 122.

In a cloud environment, it can be challenging to perform required maintenance and upgrades to device hardware and software while ensuring that there is no adverse impact to the workloads existing within the environment. Given the variation and variability of the workloads that may be instantiated on a device, it is a logistical challenge to perform testing (e.g., regression testing) to ensure every change will not adversely impact each possible workload that could be deployed to the device.

In the illustrated embodiment, the method 700 performs a synthetic workload profile generation based on a simulation of the execution of a workload in a test environment. The synthetic workload profile can then be used, for example, in a comparison with an existing workload profile to determine if there is any change in performance. The test environment may be a simulated cloud environment that can simulate network traffic to/from a device. Changes may be made to the device in the test environment (e.g., the changes that are expected to be made in the actual cloud environment, such as operating system updates), and workloads may be deployed to the (changed) device. Simulations may then be run to measure the performance of the workload in the presence of the changes.

In step 702, the method 700 may comprise selecting one or more workloads to test, and obtaining its associated workload profile. In one embodiment, step 702 may further comprise selecting one or more metrics measured by the workload profile. For example, the method 700 may select resource requirements (e.g., number of CPUs, RAM, disk size) or performance designations (e.g., network transmission packets per second, input/output operations per second, etc.). In some embodiments, the test environment may not obtain existing workload profiles, and instead will generate the synthetic workload profile as a baseline for workload performance.

In step 704, the method 700 generates (or selects from an existing data store) a test script using the metrics selected in step 702. In one embodiment, the test script may comprise a script that mimics the performance of the workload within the cloud environment. In one embodiment, the script may define the resource requirements or performance designations of the underlying workload or workloads.

In some embodiments, the device(s) of the test environment of the cloud platform may be changed as compared to the existing cloud platform. For example, the device(s) may have operating system patches applied or virtualization/containerization layers upgraded.

In step 706, the method 700 comprises executing the test script in the test environment. As discussed, the test environment may comprise components of the cloud platform environment, with additional changes made to devices (e.g., upgrades, patches, etc.). Test environment may also include telemetry service 112 and unsupervised clustering routine 114. During the execution of the test script, the unsupervised clustering routine will capture telemetry data generated by the executing workload and generate an alternative workload profile. These alternative workload profiles may be generated in the manner described in FIGS. 2 through 4, albeit in the test environment, not the existing cloud environment.

In one embodiment, the method 700 executes step 706 for a synthesized preconfigured time period. Depending on the metrics being measured and the configuration of the test environment (which may include emulated components such as traffic generators and testing equipment), the method 700 may parallelize (i.e., speed up) the test and thus not be required to execute the test for an entire duration. In one embodiment, the test length may be determined based on the sampling period used to generate the existing workload profiles.

In step 708, the method 700 compares the alternative workload profile to the workload profile retrieved in step 702 for the workload being executed in the test environment.

As discussed, during the test execution, the method 700 generates an alternative workload profile based on the execution of the workload on the components of the test environment. Since the test environment modified the underlying infrastructure and non-tenant software (e.g., hypervisor, operating system, etc.) of the existing cloud platform, the alternative workload profile may differ from the existing workload profile.

In some embodiments, the method 700 may determine that the alternative workload profile is the same as the existing workload profile received in step 702. Alternatively, the method 700 may determine that the alternative workload profile differs within a preconfigured tolerance from the existing workload profile received in step 702. In this case, the method 700 outputs (step 710) a passing result.

On the other hand, the method 700 may determine that the alternative workload profile differs from the existing workload profile received in step 702. In some embodiments, the alternative workload profile may be found to differ from the existing workload profile received in step 702 when at least one GMM for one metric of the alternative workload profile differs from the corresponding GMM for the same metric of the existing workload profile by a preconfigured tolerance. If the alternative workload profile differs from the corresponding existing workload profile received in step 702, the method 700 outputs (step 710) a warning or similar signal.

In some embodiments, the method 700 may be run using multiple workloads concurrently. For example, multiple workload instances may be deployed to the changed device in the test environment, and the test scripts may be executed concurrently to produce telemetry vectors for each workload. Concurrent testing may allow for more efficient testing operations. The concurrent testing may be of the same type of workload (which would allow more data to be collected for creation of the alternative workload profile) or of workloads of different types (which would allow for more alternative workload profiles to be created in faster time). Likewise, multiple devices may be used in the test environment, such that multiple synthetic workload profile generation operations can be performed across the multiple devices.

In one embodiment, the method 700 may be run automatically prior to any infrastructure change. In this embodiment, the output of step 710 may be used by an upgrade process to determine whether or not to continue with an upgrade. For example, if an upgrade process is desired, the upgrade may be simulated in the test environment used by the method 700 and a warning output in step 710 may prevent the deployment of the upgrade until the difference between the alternative workload profile and the existing workload profile is accounted for.

To illustrate the foregoing method 700, an example of a cellular network operator applying an operating system upgrade across devices of a cloud platform is provided. In this example, the devices operating a previous version of the operating system are updated in a test environment. Next, the method 700 deploys one or more workloads used in the cellular network (e.g., a user plane function) to the upgraded devices in the test environment, and retrieves the existing workload profiles associated with the deployed workloads. The method 700 then simulates network traffic and operations for a preconfigured duration, causing the one or more workloads to generate telemetry vectors. Alternative workload profiles are generated including, as an example, an alternative workload profile for the user plane function. The method 700 then compares the alternative workload profile with the existing workload profile and outputs an appropriate result. As one example, if the Gaussian distribution associated with disk activity shows a significant increase in the alternate workload profile compared to the existing workload profile, this indicates that the operating system upgrade of the corresponding hardware likely negatively impacted this metric of the workload. Thus, the method 700 may further comprise provisioning for additional storage capacity for the impacted workloads as part of performing the operating system upgrade. Thus, in some embodiments, the output of the method 700 may be used to: adjust the placement of workloads (such as described above and in FIG. 5), and/or adjust the predictions of infrastructure requirements (such as described above and in FIG. 6). Additionally, or alternatively, the results of the comparison may flag that the application code implementing the workload may need to be modified to reduce disk activity.

Figure 8:
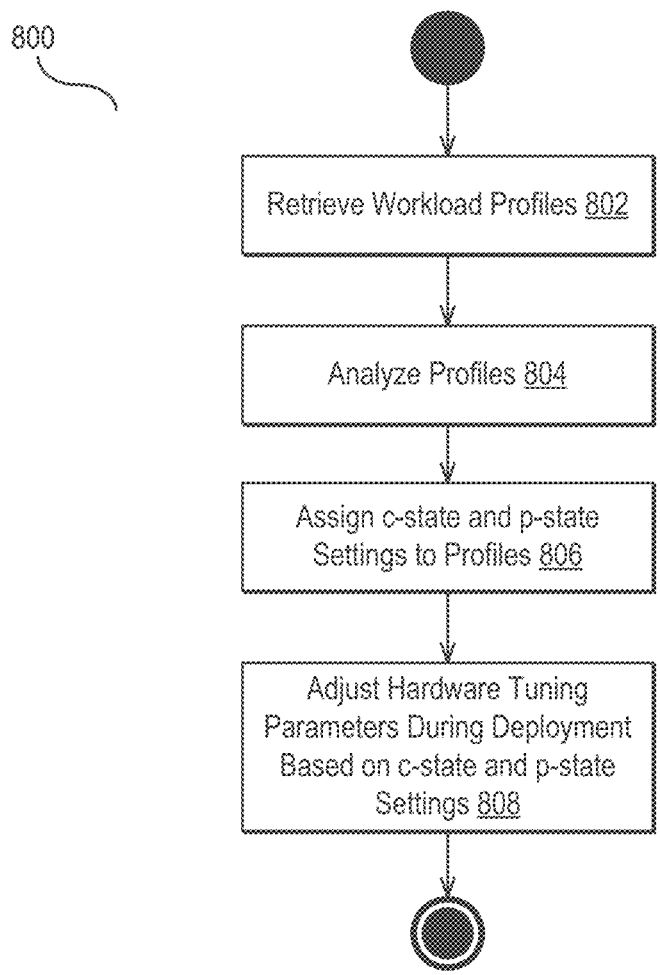
FIG. 8 is a flow diagram illustrating a method for tuning cloud infrastructure based on workload profiles according to some embodiments.

FIG. 8 is a flow diagram illustrating a method for tuning cloud infrastructure based on workload profiles according to some embodiments. All or portions of the method 800 may be performed by performance tuner 124.

As telecommunications services transition from the dedicated hardware approach of physical network functions into a cloud environment as virtualized network functions, the amount of data center resources used for providing networking services continues to grow. With this expansion comes an increased level of power consumption and infrastructure cooling costs. Furthermore, unlike traditional data centers that are centralized into large facilities that can be served by ultra-efficient power and cooling systems (or located near to power generation and cooler environments), telecommunications companies require a geographically distributed footprint that reduces the latency experienced by the end user. The smaller datacenters that come with this distributed footprint limit the ability to use these types of power and cooling solutions due to space, availability, cost, etc.

Some processing elements (e.g., CPUs, CPUs, etc.) now include tuning capabilities. For example, some processing elements support variable clock speed settings (referred to as p-states) (e.g., P0 may correspond to a 2.3 GHz clock speed, P1 with a 980 MHz clock speed, etc.). This frequency change directly impacts power consumption making the p-state both a frequency and voltage operating point. Additionally, some processing elements support variable energy savings mode (referred to as c-states). For example, state C0 represents the processing element in a fully active mode, C1 stops the CPU main internal clocks via software while the bus interface unit and Advanced Programmable Interrupt Controller (APIC) are kept running at full speed, C2 stops the CPU main internal clocks via software and reduces CPU voltage while bus interface unit and APIC are kept running at full speed, etc. Various processing elements can support various levels of c-state and p-state values and the specific mechanics of c-state and p-state operations are not limiting.

In either c-states or p-states, reducing the power draw on the server lowers infrastructure's direct power consumption. This reduced power consumption had a direct impact on the thermal load produced by servers, and can reduce the need for infeasible power sources and cooling systems.

While modification of c-states and p-states can reduce power consumption and cooling requirements, it can have adverse effects on workloads executing on those processing elements. For example, the reduction of clock speed via a processing element's p-states from 2.3 GHz to 980 MHz would roughly double the time needed for a workload to execute on the processing element. If the workload supports a low-latency service, such an impact would be significant. However, if the workload is supporting a non-critical application, such a delay may be negligible. Similarly with c-states, the deeper the level of sleep (or idle) that the processor falls into when there is no active workload, the longer it takes to wake up when a task has been assigned. Depending on the nature of the workload assigned to the server (or processor), either the increased execution time or increased time to wake up from a sleep state can adversely impact performance. To address this trade-off, the method 800 utilizes workload profiles to map workload types to device p-state and c-state settings.

In step 802, the method 800 may comprise retrieving workload profiles. As discussed, the workload profiles may be generated via an unsupervised clustering routine and may include probability densities of various measured metrics defining the performance of the workloads associated with the workload profiles. In one embodiment, a downstream application such as a performance tuner 124 implementing the method 800 retrieves the workload profiles from a profiles data storage device as discussed in connection with FIG. 1.

In step 804, the method 800 may comprise analyzing the workload profiles. In one embodiment, the method 800 may utilize a set of rules that maps probabilities to c-state and p-state settings. For example, a workload profile that indicates a mean CPU usage exceeding 15% may be assigned to a higher p-state (e.g., a slower clock speed) and/or a high c-state (e.g., a less active CPU state). Thus, such a rule may be crafted as "if cpu.usage<=0.15 then c-state=C2 and p-state=P3." While CPU utilization is used as an example, similar such rules can be created for any metric based on the desired system performance. In another embodiment, the method 800 may simulate the change in c-state or p-state according to the methods discussed in FIG. 7. That is, the method 800 may simulate adjusting a c-state or p-state on a hardware device and simulate the workload in a test environment. If the workload does not experience negative impacts of the change (e.g., an alternative workload profile is substantially similar to the existing workload profile), the method 800 may assign the tested c-state and p-state values to the workload profile. In one embodiment, the method 800 may further assign c-state and p-state values to similar workload profiles. Thus, if a first profile is assigned a c-state and p-state, the method 800 may identify those workload profiles similar to the first profile and propagate the change accordingly.

In step 806, the method 800 may comprise assigning c-state and p-state settings to the workload profiles. In one embodiment, the method 800 may write the c-state and p-state settings directly to the workload profile. In another embodiment, the method 800 may maintain a lookup table mapping workload identifier values to c-state and p-state values.

In step 808, the method 800 may comprise adjusting the hardware tuning parameters during the deployment of the workloads based on the c-state and p-state settings. For example, an instruction may be provided to the orchestrator 128 to indicate the c-state and p-state settings that should be in place for deployment of a selected workload instance. In one embodiment, the method 800 can proactively issue commands to the operating systems managing the workloads. Such commands may instruct the operating system to change the c-state and p-state values of the underlying hardware. In one embodiment, the method 800 may continuously re-evaluate the c-state and p-state settings based on updated workload profiles. Specifically, the method 800 may determine if a change in a workload profile indicates a misapplied c-state or p-state. For example, a significant increase in memory usage may indicate that a raised p-state has reduced clock speed too much, resulting in excess memory usage while data to be written to disk is cached.

A telecommunications network may consist of many services. These services perform a variety of different functions that can range from administrative tasks to facilitating user-plane workloads. As a result of this breadth of services supported within an environment comes a wide range of minimum infrastructure performance requirements. By utilizing workload profiles, a network can identify which network services might be adversely impacted by allowing transitions into deeper p-states or c-states. For example, in the case of user-plane applications that are more latency-sensitive, lower c-states (i.e., C0/C1) may be employed. Simultaneously, more administrative workloads may support a higher p-state (P1) and c-state (C6) to maximize the physical server's power savings.

Figure 9:
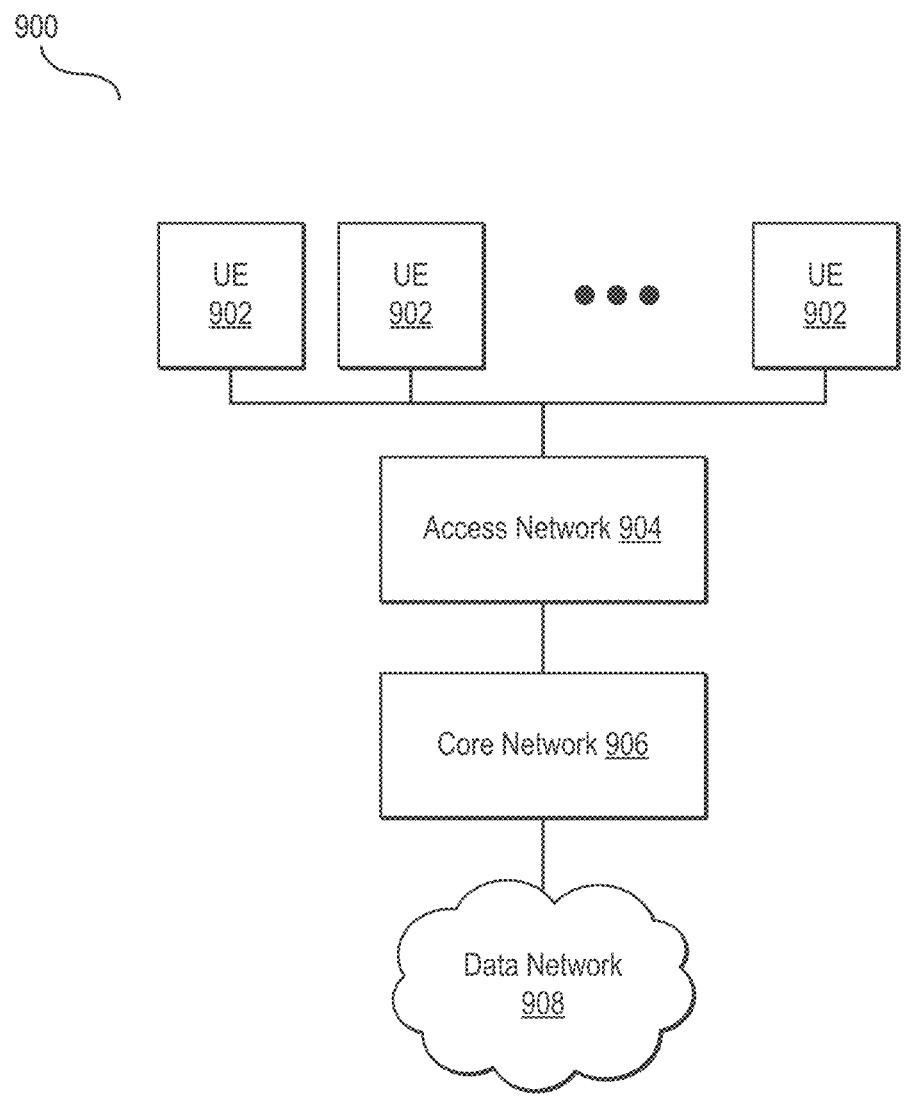
FIG. 9 is a block diagram of a cellular network according to some embodiments.

FIG. 9 is a block diagram of a cellular network according to some embodiments.

In the illustrated embodiment, a system 900 includes UE 902 that accesses a data network 908 via an access network 904 and a core network 906. In the illustrated embodiment, UE 902 comprises any computing device capable of communicating with the access network 904. As examples, UE 902 may include mobile phones, tablets, laptops, sensors, Internet of Things (IoT) devices, and any other devices equipped with a cellular transceiver. One example of a UE is provided in FIG. 11.

In the illustrated embodiment, the access network 904 comprises a network allowing over-the-air network communication with UE 902. In general, the access network 904 includes at least one base station that is communicatively coupled to the core network 906 and wirelessly coupled to zero or more UE 902.

In one embodiment, the access network 904 comprises a fifth generation (5G) cellular access network. In one embodiment, the access network 904 and UE 902 comprise a NextGen Radio Access Network (NG-RAN). In an embodiment, the access network 904 includes a plurality of next Generation Node B (gNodeB) base stations connected to UE 902 via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE 902. The gNodeB may additionally include multiple network interfaces for communicating with the core network 906. In one embodiment, the gNodeB includes an interface to communicate with a mobility manager (e.g., an AMF) and a second interface to communicate with one or more gateway elements in the core network 906 such as a Session Management Function (SMF) for control data or a User Plane Function (UPF) for user data. In one embodiment, the mobility manager manages control plane traffic while the gateway elements manage user data traffic, as will be discussed. In some embodiments, base stations in the access network 904 are communicatively connected. For example, in a 5G network, individual gNodeB devices can be communicatively coupled via an X2 interface.

In one embodiment, the access network 904 comprises a fourth generation (4G) cellular access network. In some embodiments, the access network 904 comprises an LTE access network. In one embodiment, the access network 904 and UE 902 comprise an Evolved Universal Mobile Telecommunications System (UMTS) Terrestrial Radio Access Network (E-UTRAN). In an embodiment, the access network 904 includes a plurality of Evolved Node B (eNodeB) base stations connected to UE 902 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 902. The eNodeB may additionally include multiple network interfaces for communicating with the core network 906. In one embodiment, the eNodeB includes an interface to communicate with a mobility manager (e.g., a Mobility Management Entity, MME) and a second interface to communicate with one or more gateway elements in the core network 906 such as a Serving Gateway (S-GW) or Packet Data Network Gateway (P-GW). In one embodiment, the mobility manager manages control plane traffic while the gateway elements manage user data traffic, as will be discussed. In some embodiments, base stations in the access network 904 are communicatively connected. For example, in a 4G network, individual eNodeB devices can be communicatively coupled, for example via an X2 interface or any other interface.

In some embodiments, the access network 904 may operate in a dual-connectivity mode wherein a single UE 902 connects to multiple base stations in the access network 904 simultaneously. In some embodiments, dual connectivity may be implemented via New Radio Dual Connectivity (NR-DR), E-UTRA—NR Dual Connectivity (EN-DC), NG-RAN—E-UTRA-NR Dual Connectivity (NGEN-DC), or NR—E-UTRA Dual Connectivity (NE-DC).

In the illustrated embodiment, the access network 904 provides access to a core network 906 to the UE 902. In the illustrated embodiment, the core network may be owned and/or operated by a mobile network operator (MNO) and provides wireless connectivity to UE 902. In the illustrated embodiment, this connectivity may comprise voice and data services. The core network 906 includes various computing devices, which are described briefly herein. Further detail of such devices is provided in FIG. 11.

At a high-level, the core network 906 may include a user plane and a control plane. In one embodiment, the control plane comprises network elements and communications interfaces to allow for the management of user connections and sessions. By contrast, the user plane may comprise network elements and communications interfaces to transmit user data from UE 902 to elements of the core network 906 and to external network-attached elements in a data network 908 such as the Internet. An example of a control plane function comprises authenticating that a user can access the core network 906 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 906 may include a mobility manager, one or more gateways (e.g., a serving gateway and packet gateway), and a subscriber database. In practice, the core network 906 may include more components than these. In a 4G network, the mobility manager may be implemented by an MME, the serving gateway by an S-GW, the packet gateway by a P-GW, and the subscriber database by a home subscriber server (HSS). In a 5G network, the mobility manager may be implemented by an AMF, SMF, and an Authentication Server Function (AUSF). Specifically, the AMF performs mobility management while the SMF performs session management, both of which are described herein. Further, the AUSF obtains authentication vectors from a subscriber database. In a 4G network, the MME performs all of these functions. The serving gateway in a 5G network may be implemented by the SMF as well. Specifically, packet routing from the base station to the packet gateway may be handled by the SMF in contrast to the S-GW in a 4G network. In a 5G network, the packet gateway may be implemented by the UPF, which provides packet routing from the serving gateway to external services and manages Internet Protocol (IP) address allocation as well as content filtering and blocking. In a 5G network, the subscriber database may be implemented by a Unified Data Repository (UDR), which stores the subscriber data. Access to the UDR may be mediated by Unified Data Management (UDM), which is part of the subscriber database, as described herein.

In brief, a UE 902 communicates with the mobility manager to authenticate and establish a session or bearer with the serving and packet gateways. The mobility manager accesses the subscriber data to confirm the UE 902 identity and communicates with the serving gateway to establish the session. Once established, the UE 902 transmits data requests through the session to the packet gateway, which manages the transmitting and receiving data to and from external network services. Specific details of these elements are provided in the following figures.

In the illustrated embodiment, the access network 904 and the core network 906 are operated by an MNO. However, in some embodiments, the networks 904, 906 may be operated by a private entity and may be closed to public traffic. For example, the components of the network 906 may be provided as a single device, and the access network 904 may comprise a small form-factor base station. In these embodiments, the operator of the device can simulate a cellular network, and UE 902 can connect to this network similar to connecting to a national or regional network.

In the illustrated embodiment, all or a portion of the access network 904 and core network 906 may be implemented in a cloud computing platform such as cloud platform 100. In such an embodiment, various functions of access network 904 and/or core network 906 may be implemented as workloads, or collections of workloads, as discussed previously. For example, in a 5G network, various network functions may be implemented as workloads, or collections of workloads.

Figure 10:
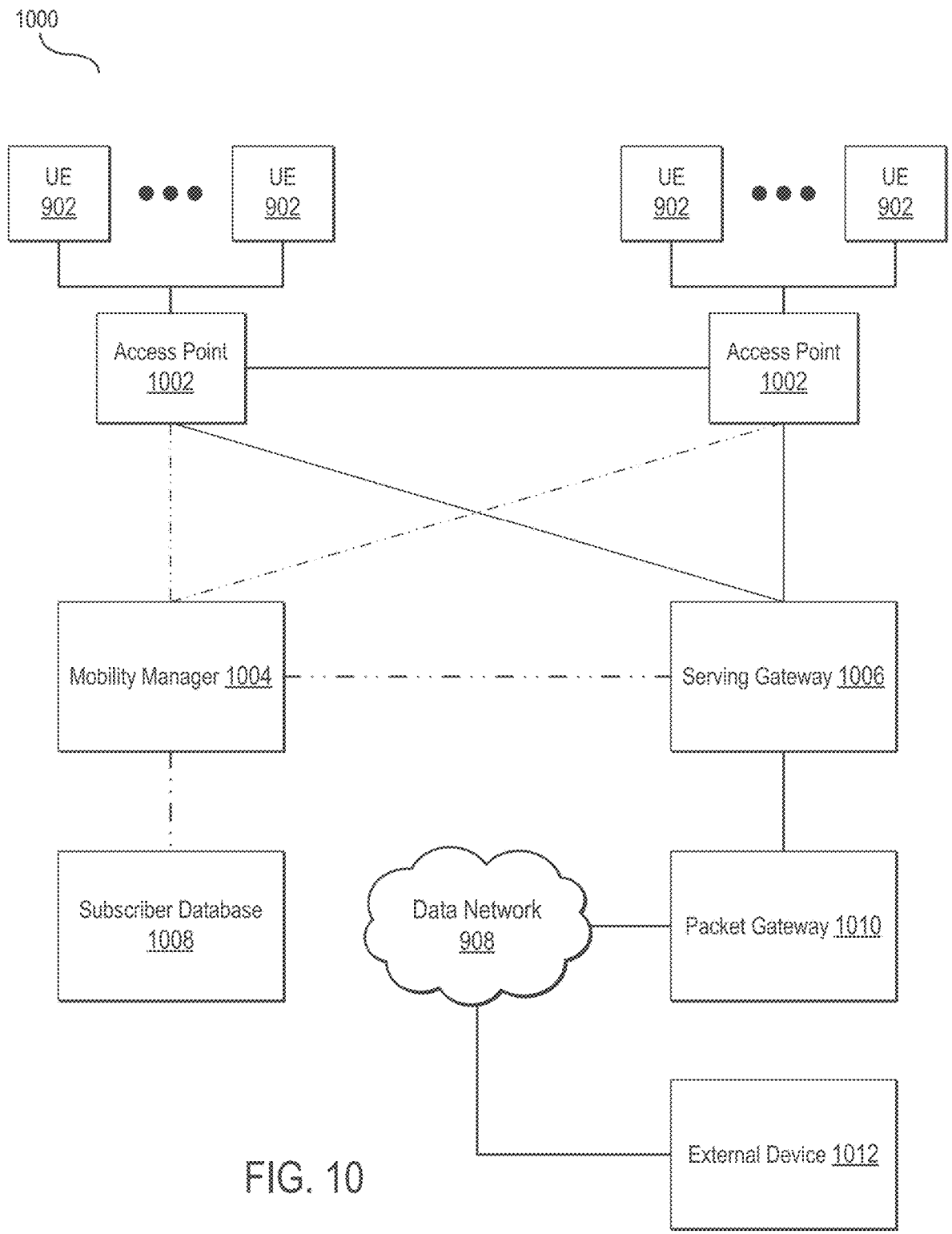
FIG. 10 is a block diagram illustrating a cellular network according to some embodiments.

FIG. 10 is a block diagram illustrating a cellular network according to some embodiments.

In the illustrated embodiment, a system 1000 includes UE 902 communicatively connected to access points 1002. As seen in FIG. 3, the access points 1002 form an access network such as a network 904. In one embodiment, the access points 1002 and UE 902 comprise a NextGen Radio Access Network (NG-RAN). In an embodiment, the access points 1002 comprise a plurality of gNodeB base stations connected to UE 902 via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE 902. The gNodeB additionally includes multiple network interfaces for communicating with the core network and, specifically, mobility manager 1004 and serving gateway 1006. In one embodiment, the mobility manager 1004 in a 5G network comprises an AMF. In one embodiment, the serving gateway 1006 comprises an SMF for control data or UPF for user data.

In another embodiment, the access points 1002 comprise eNodeB base stations connected to UE 902 via an air interface. In this embodiment, the air interface comprises an E-UTRAN Uu or LTE Uu radio air interface. In some embodiments, an E-UTRAN Uu interface utilizes an orthogonal frequency-division multiple access (OFDM) downlink modulation scheme and a single-carrier frequency-division multiple access (SC-FDM) uplink modulation scheme. In these embodiments, the eNodeB provides all functionality to implement and operate the air interface and negotiates uplinks and downlinks with the UE 902. The eNodeB additionally includes multiple network interfaces for communicating with the core network and, specifically, mobility manager 1004 and serving gateway 1006. In one embodiment, the mobility manager 1004 comprises an MME in a 4G network. In the illustrated embodiment, solid lines between network elements 1004, 1006, 1008, and 1010 represent user data traffic while dashed lines between network elements 1004, 1006, 1008, and 1010 represent control or non-access stratum (NAS) traffic.

In the illustrated embodiment, the mobility manager 1004 manages control plane traffic while the gateway elements 1006, 1010 manage user data traffic. Specifically, the mobility manager 1004 may comprise hardware or software for handling network attachment requests from UE 902. As part of processing these requests, the mobility manager 1004 accesses a subscriber database 1008. The subscriber database 1008 comprises hardware or software that stores user authorization and authentication data and validates users to the network. In some embodiments, the subscriber database 1008 may comprise a UDM and UDR in a 5G network. In another embodiment, the subscriber database 1008 may comprise an HSS in a 4G network. In one embodiment, the subscriber database 1008 may also store a location of the user updated via a Diameter or similar protocol.

The mobility manager 1004 may also be configured to create data sessions or bearers between UE 902 and serving gateway 1006 or packet gateway 1010. In one embodiment, the serving gateway 1006 and packet gateway 1010 may comprise single or separate devices. In general, the serving gateway 1006 routes and forwards user data packets while also acting as the mobility anchor for the user plane during access point handovers and as the anchor for mobility between different network technologies. For idle state UE 902, the serving gateway 1006 terminates the downlink data path and triggers paging when downlink data arrives for the UE 902. The serving gateway 1006 manages and stores UE 902 contexts, e.g., parameters of the IP bearer service, network internal routing information. In a 5G network, the serving gateway 1006 may be implemented by an SMF. In a 4G network, the serving gateway 1006 may be implemented by an S-GW.

The serving gateway 1006 is communicatively coupled to a packet gateway 1010. In general, the packet gateway 1010 provides connectivity from the UE 902 to external packet data networks (PDNs) such as data network 908 by being the point of exit and entry of traffic to external networks (e.g., 908). UE 902 may have simultaneous connectivity with more than one packet gateway 1010 for accessing multiple packet data networks. The packet gateway 1010 performs policy enforcement, packet filtering for each user, charging support, lawful interception, and packet screening. In the illustrated embodiment, the packet gateway 1010 also limits access to endpoints such as external device 1012. In a 5G network, the packet gateway 1010 may be implemented by a UPF. In a 4G network, the packet gateway 1010 may be implemented by a P-GW.

In the illustrated embodiment, an external device 1012 is communicatively coupled to the core network via the data network 908. In one embodiment, the data network 908 may comprise the Internet. In the illustrated embodiment, the external device 1012 may comprise any electronic device capable of communicating with the data network 908 and the disclosure is not limited to specific types of network devices.

As discussed, in some embodiments, UE 902 may alternatively connect to multiple access points 1002 in a dual-connectivity arrangement. In this embodiment, such a UE 902 will have multiple data paths through the core network and control and user plane separation (CUPS) may be used to route control and user data traffic.

Figure 11:
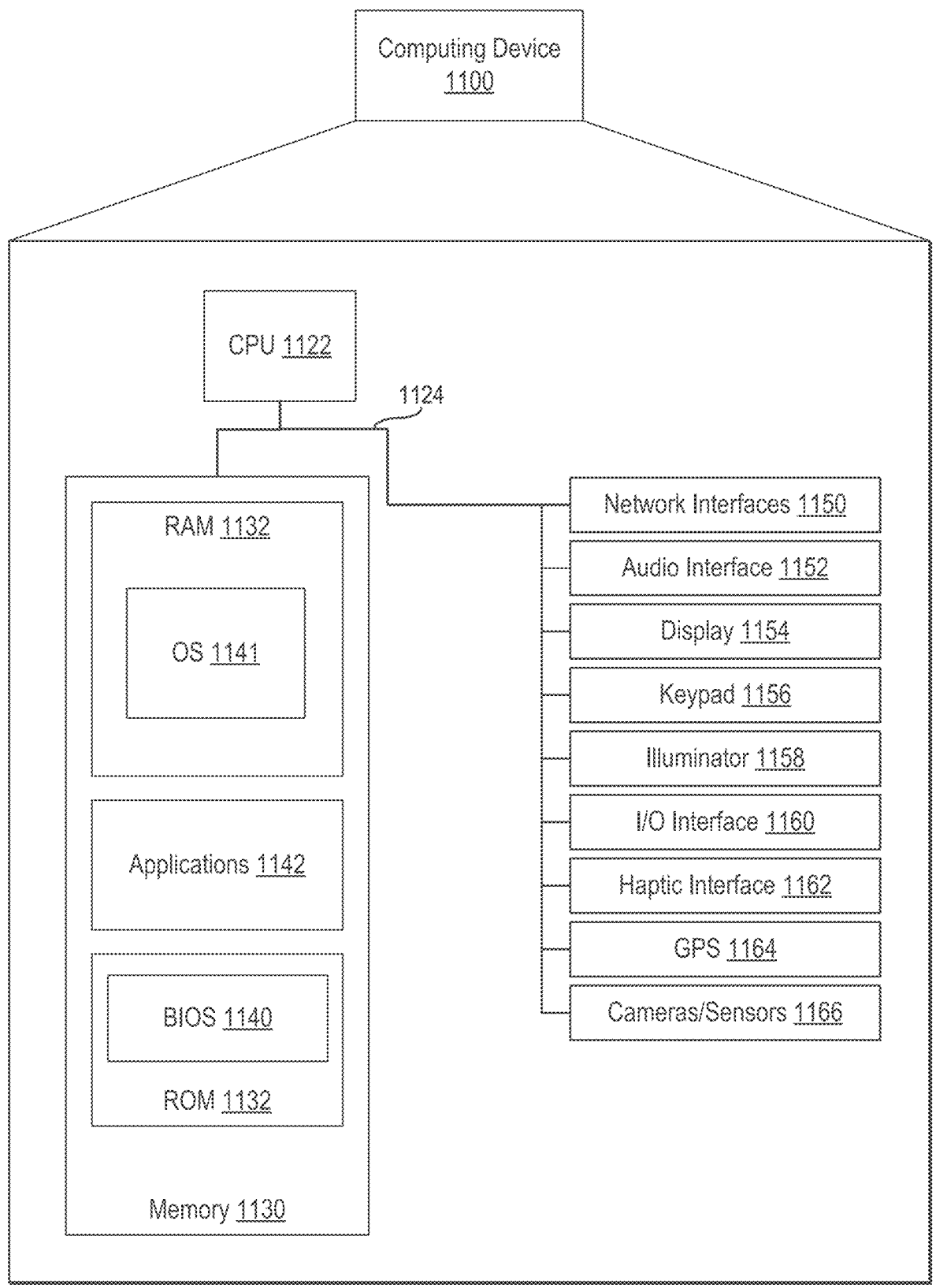
FIG. 11 is a block diagram illustrating a computing device showing an example of a client or server device used in the various embodiments.

FIG. 11 is a block diagram illustrating a computing device showing an example of a client or server device used in the various embodiments of the disclosure.

The computing device (1100) may include more or fewer components than those shown in FIG. 11, depending on the deployment or usage of the device (1100). For example, a server computing device, such as a rack-mounted server, may not include an audio interface (1152), display (1154), keypad (1156), illuminator (1158), haptic interface (1162), Global Positioning Service (GPS) receiver (1164), or cameras/sensor (1166). Some devices may include additional components not shown, such as graphics processing unit (GPU) devices, cryptographic coprocessors, artificial intelligence (AI) accelerators, or other peripheral devices.

As shown in the figure, the device (1100) includes a central processing unit (CPU) (1122) in communication with a mass memory (1130) via a bus (1124). The computing device (1100) also includes one or more network interfaces (1150), an audio interface (1152), a display (1154), a keypad (1156), an illuminator (1158), an input/output interface (1160), a haptic interface (1162), an optional global positioning systems (GPS) receiver (1164) and a camera(s) or other optical, thermal, or electromagnetic sensors (1166). Device (1100) can include one camera/sensor (1166) or a plurality of cameras/sensors (1166). The positioning of the camera(s)/sensor(s) (1166) on the device (1100) can change per device (1100) model, per device (1100) capabilities, and the like, or some combination thereof.

In some embodiments, the CPU (1122) may comprise a general-purpose CPU. The CPU (1122) may comprise a single-core or multiple-core CPU. The CPU (1122) may comprise a system-on-a-chip (SoC) or a similar embedded system. In some embodiments, a GPU may be used in place of, or in combination with, a CPU (1122). Mass memory (1130) may comprise a dynamic random-access memory (DRAM) device, a static random-access memory device (SRAM), or a Flash (e.g., NAND Flash) memory device. In some embodiments, mass memory (1130) may comprise a combination of such memory types. In one embodiment, the bus (1124) may comprise a Peripheral Component Interconnect Express (PCIe) bus. In some embodiments, the bus (1124) may comprise multiple busses instead of a single bus.

Mass memory (1130) illustrates another example of computer storage media for the storage of information such as computer-readable instructions, data structures, program modules, or other data. Mass memory (1130) stores a basic input/output system ("BIOS") (1140) for controlling the low-level operation of the computing device (1100). The mass memory also stores an operating system (1141) for controlling the operation of the computing device (1100)

Applications (1142) may include computer-executable instructions which, when executed by the computing device (1100), perform any of the methods (or portions of the methods) described previously in the description of the preceding figures. In some embodiments, the software or programs implementing the method embodiments can be read from a hard disk drive (not illustrated) and temporarily stored in RAM (1132) by CPU (1122). CPU (1122) may then read the software or data from RAM (1132), process them, and store them to RAM (1132) again.

The computing device (1100) may optionally communicate with a base station (not shown) or directly with another computing device. Network interface (1150) is sometimes known as a transceiver, transceiving device, or network interface card (NIC).

The audio interface (1152) produces and receives audio signals such as the sound of a human voice. For example, the audio interface (1152) may be coupled to a speaker and microphone (not shown) to enable telecommunication with others or generate an audio acknowledgment for some action. Display (1154) may be a liquid crystal display (LCD), gas plasma, light-emitting diode (LED), or any other type of display used with a computing device. Display (1154) may also include a touch-sensitive screen arranged to receive input from an object such as a stylus or a digit from a human hand.

Keypad (1156) may comprise any input device arranged to receive input from a user. Illuminator (1158) may provide a status indication or provide light.

The computing device (1100) also comprises an input/output interface (1160) for communicating with external devices, using communication technologies, such as USB, infrared, Bluetooth™, or the like. The haptic interface (1162) provides tactile feedback to a user of the client device.

The optional GPS receiver (1164) can determine the physical coordinates of the computing device (1100) on the surface of the Earth, which typically outputs a location as latitude and longitude values. GPS receiver (1164) can also employ other geo-positioning mechanisms, including, but not limited to, triangulation, assisted GPS (AGPS), E-OTD, CI, SAI, ETA, BSS, or the like, to further determine the physical location of the computing device (1100) on the surface of the Earth. In one embodiment, however, the computing device (1100) may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the example embodiments as set forth in the claims that follow. The specification and drawings are accordingly to be regarded in an illustrative rather than restrictive sense.

What is claimed is:

1. A method comprising:

receiving telemetry vectors from a computing device in a cloud platform, each of the telemetry vectors including a plurality of measured values associated with a workload executing on the computing device;

clustering the telemetry vectors using an unsupervised learning algorithm, the unsupervised learning algorithm outputting parameters associated with a plurality of clusters;

generating a workload profile from the plurality of clusters by selecting at least one cluster from the plurality of clusters and storing corresponding parameters of the at least one cluster as the workload profile;

receiving a second workload and a candidate workload profile associated with the second workload;

retrieving active workload profiles, the active workload profiles associated with workloads executing in the cloud platform;

generating node configurations, each of the node configurations including the candidate workload profile and a combination of the active workload profiles, wherein generating each node configuration comprises simulating an expected resource utilization by generating random performance data for each workload profile in the node configuration using probability distributions from the respective workload profiles; and reallocating workloads based on an optimal node configuration in the node configurations.

2. The method of claim 1, wherein the plurality of measured values comprises one or more of number of packets transmitted; number of bytes transmitted; number of packets received; number of bytes received; number of disk read requests; number of disk write requests; number of bytes read from disk; number of bytes written to disk; processor instructions executed per second; memory utilization; resource quantity; resource performance settings; resource locations; number of resource instances; and external influences.

3. The method of claim 1, wherein the workload comprises a container or a virtual machine.

4. The method of claim 1, wherein receiving telemetry vectors from a computing device in a cloud platform comprises receiving the telemetry vectors over a pre-configured time span and wherein the clustering is performed upon an expiration of the pre-configured time span.

5. The method of claim 1, wherein clustering the telemetry vectors comprises constructing a Gaussian Mixture Model (GMM) based on the telemetry vectors.

6. The method of claim 5, the GMM comprising a sum of k mixture components trained using the telemetry vectors, where k is a positive integer.

7. The method of claim 5, wherein after receiving the telemetry vectors, the method comprises applying an expectation maximization algorithm to the telemetry vectors to estimate parameters of the GMM.

8. The method of claim 1, wherein the workload profile includes a plurality of distribution sets, each distribution set in the plurality of distribution sets associated with a type of the measured values.

9. The method of claim 1, further comprising: generating an infrastructure model of the cloud platform; and simulating workloads using the infrastructure model and a plurality of workload profiles generated using the unsupervised learning algorithm.

10. The method of claim 1, further comprising: generating a test script using at least one metric stored in the workload profile; executing the test script in a test environment corresponding to the cloud platform, the executing the test script generating an alternative workload profile for the workload; and computing a comparison between the workload profile and the alternative workload profile.

11. The method of claim 1, further comprising: assigning a c-state setting and p-state setting to the workload based on the workload profile; and tuning a physical processing element executing the workload based on the c-state setting and p-state setting.

12. A non-transitory computer-readable storage medium for tangibly storing computer program instructions capable of being executed by a computer processor, the computer program instructions defining steps of:
receiving telemetry vectors from a computing device in a cloud platform, each of the telemetry vectors including a plurality of measured values associated with a workload executing on the computing device;
clustering the telemetry vectors using an unsupervised learning algorithm, the unsupervised learning algorithm outputting parameters associated with a plurality of clusters;
generating a workload profile from the plurality of clusters by selecting at least one cluster from the plurality of clusters and storing corresponding parameters of the at least one cluster as the workload profile;
receiving a second workload and a candidate workload profile associated with the second workload;
retrieving active workload profiles, the active workload profiles associated with workloads executing in the cloud platform;
generating node configurations, each of the node configurations including the candidate workload profile and a combination of the active workload profiles, wherein generating each node configuration comprises simulating an expected resource utilization by generating random performance data for each workload profile in the node configuration using probability distributions from the respective workload profiles; and
reallocating workloads based on an optimal node configuration in the node configurations.

13. The non-transitory computer-readable storage medium of claim 12, wherein the plurality of measured values comprises one or more of number of packets transmitted; number of bytes transmitted; number of packets received; number of bytes received; number of disk read requests; number of disk write requests; number of bytes read from disk; number of bytes written to disk; processor instructions executed per second; memory utilization; resource quantity; resource performance settings; resource locations; number of resource instances; and external influences.

14. The non-transitory computer-readable storage medium of claim 12, wherein receiving telemetry vectors from a computing device in a cloud platform comprises receiving the telemetry vectors over a pre-configured time span and wherein the clustering is performed upon an expiration of the pre-configured time span.

15. The non-transitory computer-readable storage medium of claim 12, wherein clustering the telemetry vectors comprises constructing a Gaussian Mixture Model (GMM) based on the telemetry vectors.

16. A device comprising:
a processor configured to:
receive telemetry vectors from a computing device in a cloud platform, each of the telemetry vectors including a plurality of measured values associated with a workload executing on the computing device;
cluster the telemetry vectors using an unsupervised learning algorithm, the unsupervised learning algorithm outputting parameters associated with a plurality of clusters;
generate a workload profile from the plurality of clusters by selecting at least one cluster from the plurality of clusters and storing corresponding parameters of the at least one cluster as the workload profile;
receive a second workload and a candidate workload profile associated with the second workload;
retrieve active workload profiles, the active workload profiles associated with workloads executing in the cloud platform;
generate node configurations, each of the node configurations including the candidate workload profile and a combination of the active workload profiles, wherein generating each node configuration comprises simulating an expected resource utilization by generating random performance data for each workload profile in the node configuration using probability distributions from the respective workload profiles; and
reallocate workloads based on an optimal node configuration in the node configurations.

17. The device of claim 16, wherein the plurality of measured values comprises one or more of number of packets transmitted; number of bytes transmitted; number of packets received; number of bytes received; number of disk read requests; number of disk write requests; number of bytes read from disk; number of bytes written to disk; processor instructions executed per second; memory utilization; resource quantity; resource performance settings; resource locations; number of resource instances; and external influences.

18. The device of claim 16, wherein receiving telemetry vectors from a computing device in a cloud platform comprises receiving the telemetry vectors over a pre-configured time span and wherein the clustering is performed upon an expiration of the pre-configured time span.

19. The device of claim 16, wherein clustering the telemetry vectors comprises constructing a Gaussian Mixture Model (GMM) based on the telemetry vectors.

* * * * *